(12) United States Patent
Moriya et al.

(10) Patent No.: US 10,836,260 B2
(45) Date of Patent: Nov. 17, 2020

(54) WIRELESS POWER SUPPLY SYSTEMS FOR A VEHICLE

(71) Applicant: SUBARU CORPORATION, Tokyo (JP)

(72) Inventors: Fumiyuki Moriya, Tokyo (JP); Tomofumi Okamoto, Tokyo (JP); Takuya Horie, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 149 days.

(21) Appl. No.: 16/162,700

(22) Filed: Oct. 17, 2018

(65) Prior Publication Data

US 2019/0152323 A1     May 23, 2019

(30) Foreign Application Priority Data

Nov. 22, 2017   (JP) ................. 2017-224213

(51) Int. Cl.

| B60L 3/00 | (2019.01) |
|---|---|
| B60L 15/20 | (2006.01) |
| B60L 53/38 | (2019.01) |
| B60L 53/12 | (2019.01) |
| B60L 53/37 | (2019.01) |
| B60L 53/36 | (2019.01) |

(52) U.S. Cl.
CPC .......... *B60L 3/0038* (2013.01); *B60L 3/0061* (2013.01); *B60L 3/0092* (2013.01); *B60L 15/20* (2013.01); *B60L 15/2054* (2013.01); *B60L 53/12* (2019.02); *B60L 53/36* (2019.02); *B60L 53/37* (2019.02); *B60L 53/38* (2019.02); *B60L 2240/42* (2013.01); *B60L 2260/28* (2013.01); *B60L 2260/32* (2013.01)

(58) Field of Classification Search
CPC .. B60L 15/20; B60L 15/2054; B60L 2240/42; B60L 2260/28; B60L 2260/32; B60L 3/0038; B60L 3/0061; B60L 3/0092; B60L 53/12; B60L 53/36; B60L 53/37; B60L 53/38

See application file for complete search history.

(56) References Cited

U.S. PATENT DOCUMENTS

| 6,316,909 B1 * | 11/2001 | Honda ............... G01R 31/3648 320/108 |
|---|---|---|
| 9,738,170 B2 * | 8/2017 | Okamoto ............... B60L 53/64 |
| 10,418,855 B2 * | 9/2019 | Shevde ................... H02J 50/12 |
| 2010/0072825 A1 * | 3/2010 | Azancot ................... G01V 3/08 307/104 |

(Continued)

FOREIGN PATENT DOCUMENTS

| JP | 2016-164036 A | 9/2016 |
|---|---|---|
| JP | 2017-005958 A | 1/2017 |

*Primary Examiner* — Babar Sarwar
(74) *Attorney, Agent, or Firm* — McDermott Will & Emery LLP

(57) ABSTRACT

A vehicle includes: a traction motor; a diagnostic module; a receiving coil; and a controller. The diagnostic module executes a diagnostic test of a rotational position sensor of the traction motor. The receiving coil receives a power wirelessly. The controller switches the diagnostic module to a state that is less likely to determine an error than normal when the receiving coil is positioned with respect to a supplying coil in a ground equipment.

15 Claims, 14 Drawing Sheets

(56) References Cited

U.S. PATENT DOCUMENTS

| | | | | |
|---|---|---|---|---|
| 2011/0270462 A1* | 11/2011 | Amano | ................... | B60L 53/36 |
| | | | | 700/297 |
| 2012/0223589 A1* | 9/2012 | Low | ....................... | H02J 5/005 |
| | | | | 307/104 |
| 2012/0306285 A1* | 12/2012 | Kim | ........................ | H02J 50/80 |
| | | | | 307/104 |
| 2013/0162205 A1* | 6/2013 | Nakamura | .............. | H02J 50/80 |
| | | | | 320/108 |
| 2013/0285620 A1* | 10/2013 | Yamamoto | .............. | H02J 7/025 |
| | | | | 320/155 |
| 2013/0307471 A1* | 11/2013 | Ichikawa | ................ | B60L 53/36 |
| | | | | 320/108 |
| 2014/0015334 A1* | 1/2014 | Jung | ...................... | H02J 50/60 |
| | | | | 307/104 |
| 2014/0103871 A1* | 4/2014 | Maikawa | ................ | B60L 53/12 |
| | | | | 320/108 |
| 2014/0203774 A1* | 7/2014 | Sawayanagi | ............ | H02J 50/80 |
| | | | | 320/108 |
| 2015/0171633 A1* | 6/2015 | Nakano | ................... | B60L 53/12 |
| | | | | 307/104 |
| 2015/0224883 A1* | 8/2015 | Ichikawa | ................ | B60L 50/51 |
| | | | | 320/108 |
| 2015/0380951 A1* | 12/2015 | Okamoto | ................ | B60L 53/36 |
| | | | | 307/104 |
| 2016/0214488 A1* | 7/2016 | Okamoto | ............. | H02J 7/0029 |
| 2016/0257222 A1 | 9/2016 | Nakagawa | | |
| 2016/0355095 A1* | 12/2016 | Okamoto | ................ | B60L 53/65 |
| 2018/0029482 A1* | 2/2018 | Ichikawa | ................ | B60L 50/40 |

* cited by examiner

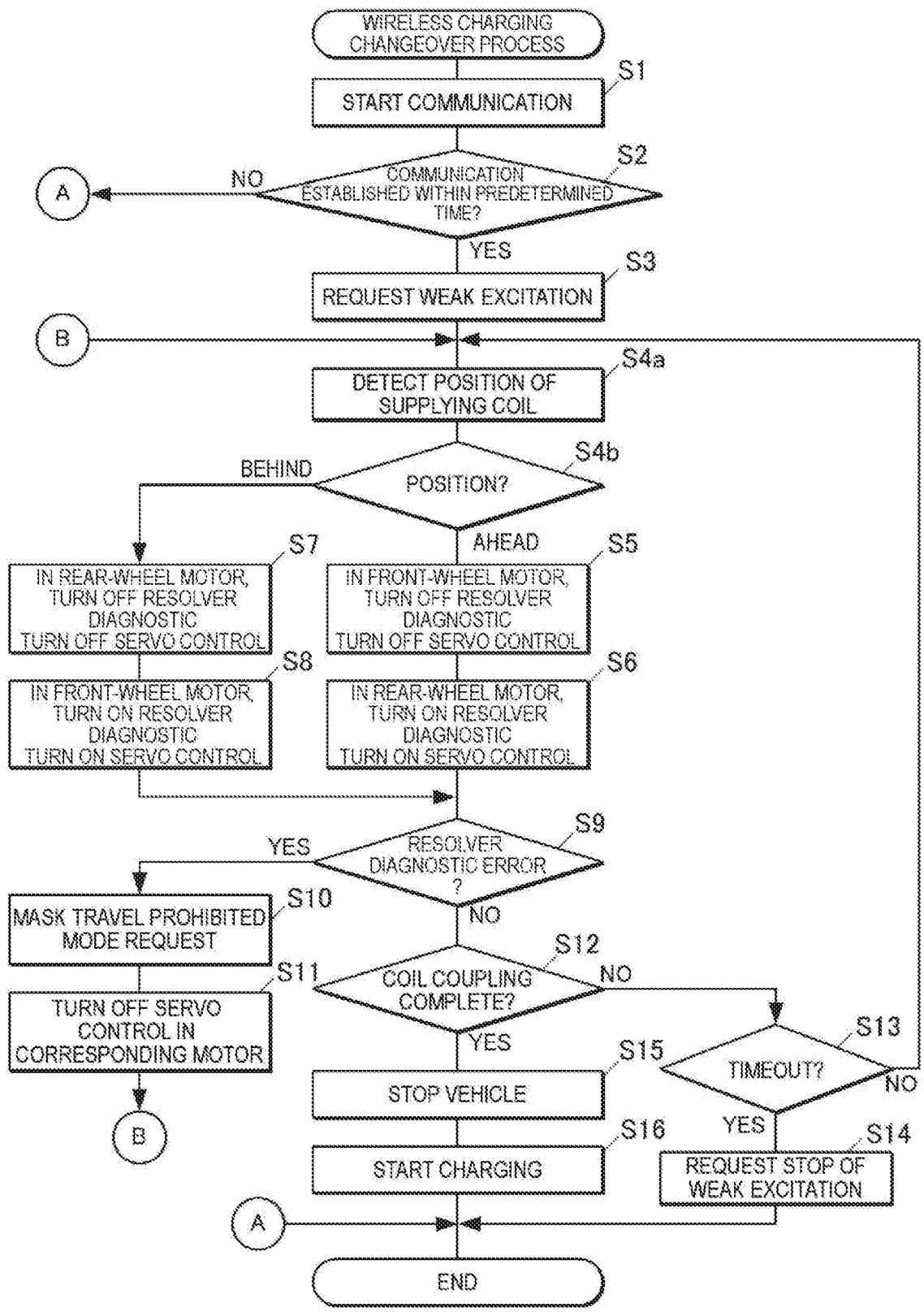

WIRELESS POWER SUPPLY SYSTEMS FOR A VEHICLE

CROSS-REFERENCE TO RELATED APPLICATIONS

The present application claims priority from Japanese Patent Application No. 2017-224213 filed on Nov. 22, 2017 the entire contents of which are hereby incorporated by reference.

BACKGROUND

1. Technical Field

The present invention relates to a vehicle including a receiving coil that receives power wirelessly and a traction motor.

2. Related Art

In the past, wireless charging systems have been investigated, in which a receiving coil is provided in a vehicle while a supplying coil is provided in ground equipment, power is transferred wirelessly from the supplying coil to the receiving coil while both coils are made to face each other, and a high-voltage battery in the vehicle is charged. In a wireless charging system, before transferring power, a process of weakly exciting the supplying coil and positioning the receiving coil to raise the coupling strength between the supplying coil and the receiving coil while measuring the coupling strength is anticipated. During the positioning, the position of the receiving coil is adjusted by moving the vehicle according to driving operations by the driver, automatic driving, or the like.

As a related technology to the present technology, Japanese Unexamined Patent Application Publication (JP-A) No. 2017-005958 discloses a technology for controlling a vehicle when positioning a receiving coil of the vehicle with a supplying coil in a wireless charging system. Also, for a vehicle provided with multiple traction motors, JP-A No. 2005-184610 discloses technology regarding how to control the other traction motor or motors when the torque of any traction motor falls contrary to a command.

SUMMARY OF THE INVENTION

An aspect of the present invention provides a vehicle including: a traction motor; a diagnostic module configured to execute a diagnostic test of a rotational position sensor of the traction motor; a receiving coil configured to receive a power wirelessly; and a controller configured to switch the diagnostic module to a state that is less likely to determine an error than normal when the receiving coil is positioned with respect to a supplying coil in a ground equipment.

An aspect of the present invention provides a vehicle including: a traction motor; a receiving coil configured to receive a power wirelessly; and circuitry configured to execute a diagnostic test of a rotational position sensor of the traction motor and switch the diagnostic module to a state that is less likely to determine an error than normal when the receiving coil is positioned with respect to a supplying coil in a ground equipment.

BRIEF DESCRIPTION OF THE DRAWINGS

FIG. 5 is a flowchart illustrating a modification of the wireless charging changeover process;

DETAILED DESCRIPTION

In the following, some preferred examples of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following example examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

The inventors have discovered an issue in which, when moving a vehicle to position a receiving coil and a supplying coil, if the magnetic field of the weakly excited supplying coil acts on the traction motor of the vehicle, a diagnostic error may be induced in a rotational position sensor of the traction motor. If a diagnostic error occurs in the rotational position sensor, ordinarily, not only is the driving of the traction motor prohibited, but as a failsafe, the vehicle is put into an undriveable state such as by cutting off a high-voltage battery from the system. For this reason, wireless charging becomes difficult.

JP-A No. 2017-005958 and JP-A No. 2005-184610 do not mention the above issue or describe technology for addressing this issue.

Also, to address the above issue, a configuration that shields the underside of the traction motor with a shielding plate that blocks magnetic fields, such as a steel plate, may be considered. However, this configuration creates the issues of increased weight of the vehicle and higher component costs due to the shielding plate.

Accordingly, in a vehicle capable of wireless charging, it is desirable to minimize situations in which the vehicle is put into an undriveable state when positioning the receiving coil, without leading to large increases in the weight of the vehicle.

Example 1

Figure 1:
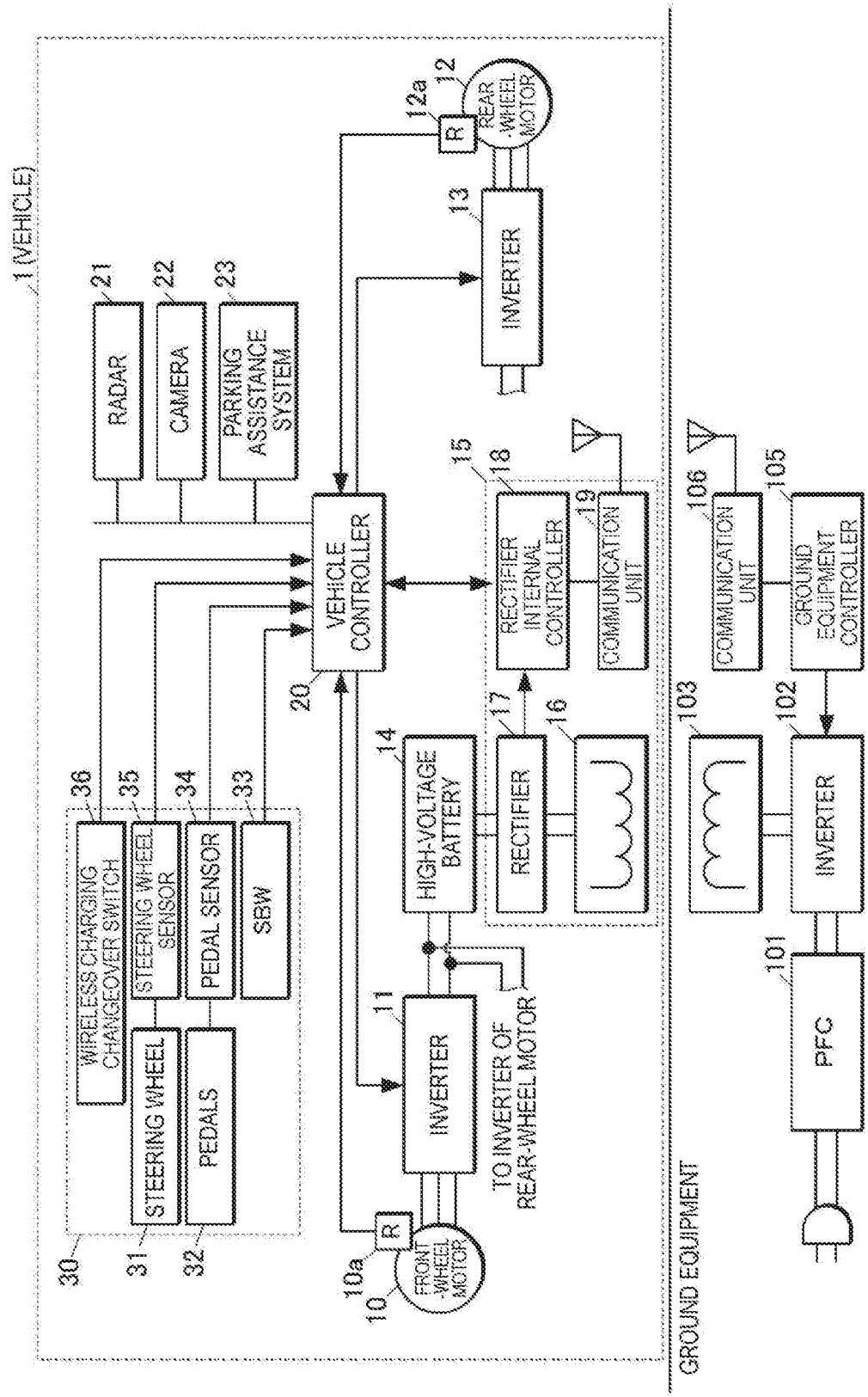
FIG. 1 is a block diagram illustrating a vehicle and ground equipment according to Example 1 of the present invention.

FIG. 1 is a block diagram illustrating a vehicle and ground equipment according to Example 1 of the present invention.

The vehicle 1 of Example 1 is an electric vehicle (EV) capable of wireless charging that includes two traction motors (a front-wheel motor 10 and a rear-wheel motor 12). As illustrated in FIG. 1, the vehicle 1 is provided with the front-wheel motor 10 that drives the front wheels, the rear-wheel motor 12 that drives the rear wheels, inverters 11 and 13 that drive the front-wheel motor 10 and the rear-wheel motor 12, and a high-voltage battery 14 that stores and supplies power for traction. Also, the vehicle 1 is provided with a wireless charging unit 15, an operation unit 30 that receives driving operations and the like by the driver, and a vehicle controller 20 that controls the vehicle 1. Additionally, a radar 21, a camera 22, and a parking assistance system 23 for confirming conditions around the vehicle 1 when parking and the like are provided in the vehicle 1. The parking assistance system 23 includes an automatic driving function that causes the vehicle 1 to move to a predetermined parking space on the basis of output from the radar 21 and an image from the camera 22. In one example, among the above configuration elements, the front-wheel motor and the rear-wheel motor correspond to one instance of a traction motor, and the vehicle controller 20 functions as one instance of each of a diagnostic module, a first diagnostic module, a second diagnostic module, a controller, a drive controller, and a vehicle mode controller.

The wireless charging unit 15 is provided with a receiving coil 16 that receives power wirelessly, and a rectifier 17 that rectifies alternating current flowing through the receiving coil 16 to supply charging current to the high-voltage battery 14. Also, the wireless charging unit 15 is provided with a communication unit 19 for wirelessly communicating (such as by Wi-Fi communication, for instance) with the source of the power, namely ground equipment, and a rectifier internal controller 18 that controls wireless power transfer. The receiving coil 16 is disposed on the bottom of the vehicle 1, between the front wheels and the rear wheels in the longitudinal direction of the vehicle 1.

The operation unit 30 is provided with a steering wheel (handle) 31 and corresponding steering wheel sensor 35, pedals 32 such as brake and accelerator pedals and a corresponding pedal sensor 34, a shift by wire (SBW) 33, and a wireless charging changeover switch 36. The SBW 33 is a system that inputs gear shift operations by the driver electronically. A signal indicating the shift position is transmitted from the SBW 33 to the vehicle controller 20. The wireless charging changeover switch 36 is operable by the driver, and is a switch by which the driver notifies the vehicle 1 to start positioning the vehicle 1 before wireless charging.

The vehicle controller 20 executes steering control of the vehicle 1 as well as driving control of the front-wheel motor 10 and the rear-wheel motor 12 according to outputs from the SBW 33 and the sensors 34 and 35. Driving control is achieved by having the vehicle controller 20 control the output of the inverters 11 and 13. By these controls, the vehicle 1 travels in accordance with driving operations by the driver.

The ground equipment is provided with a supplying coil 103 that transmits power wirelessly, as well as a power factor correction (PFC) 101, an inverter 102, and the like that receive power from an electric power system and pass current to the supplying coil 103. Additionally, the ground equipment is provided with a communication unit 106 that communicates wirelessly with the vehicle 1 during wireless charging, and a ground equipment controller 105 that drives the inverter 102 in cooperation with the vehicle 1 to excite the supplying coil 103.

Resolvers 10a and 12a that detect the rotational position are provided in the front-wheel motor 10 and the rear-wheel motor 12, respectively. In one example, the resolvers 10a and 12a correspond to an instance of a rotational position sensor. The resolvers 10a and 12a respectively detect the rotational positions of the front-wheel motor 10 and the rear-wheel motor 12 using magnetism. By controlling the inverters 11 and 13 according to these rotational positions, the vehicle controller 20 is able to cause desired torques to be output from the front-wheel motor 10 and the rear-wheel motor 12. The front-wheel motor 10 and the resolver 10a are disposed closer to the front wheels than the body center, while the rear-wheel motor 12 and the resolver 12a are disposed closer to the rear wheels than the body center.

While the vehicle 1 is traveling normally, the vehicle controller 20 continuously monitors for abnormalities in the outputs of the resolvers 10a and 12a. For instance, if the vehicle 1 is traveling normally, the vehicle controller 20 continuously monitors the resolver 10a, regardless of whether the front-wheel motor 10 is being driven. Likewise, if the vehicle 1 is traveling normally, the vehicle controller 20 continuously monitors the resolver 12a, regardless of whether the rear-wheel motor 12 is being driven. This monitoring of the output from the resolver 10a or the resolver 12a is called "resolver diagnostic", and the case of an abnormal diagnostic result is called a "resolver error". Details regarding the resolver diagnostic method will be described later with reference to FIG. 6.

In addition, the vehicle controller 20 includes a function of receiving any error information input about the vehicle 1, and causing the vehicle 1 to transition to a failsafe mode when a predetermined error occurs. The failsafe mode includes a travel prohibited mode that prohibits the travel of the vehicle 1, a high-speed travel prohibited mode that allows travel of the vehicle 1 only at low speeds, and the like. Except for special cases, normally the vehicle controller 20 causes the vehicle 1 to switch to the travel prohibited mode on the basis of a resolver error occurring.

<Wireless Charging Changeover Process>

Figure 2:
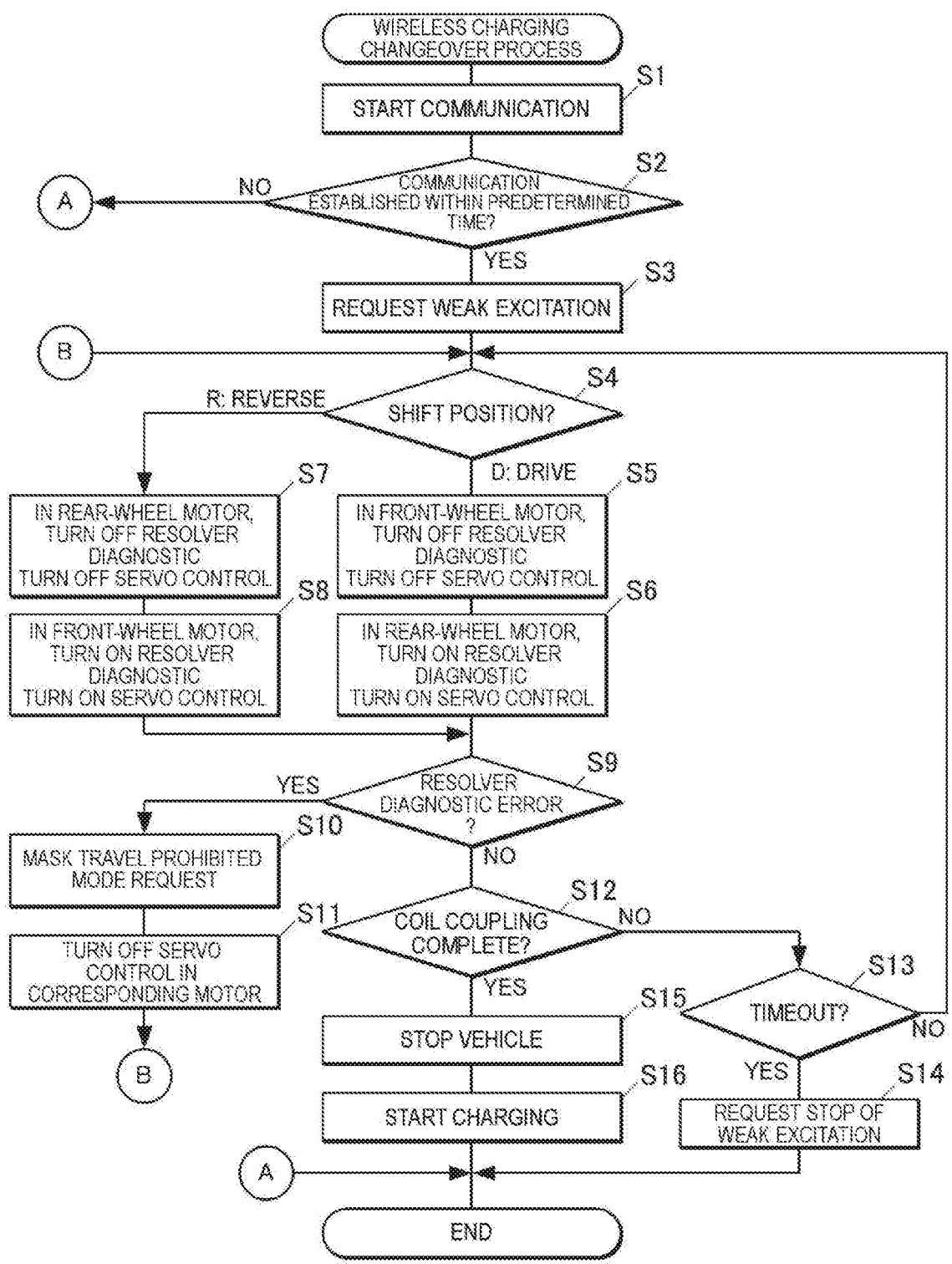
FIG. 2 is a flowchart illustrating a procedure of a wireless charging changeover process.

FIG. 2 is a flowchart illustrating a procedure of a wireless charging changeover process executed by the vehicle controller 20.

The wireless charging changeover process is started by the vehicle controller 20 due to the driver turning on the wireless charging changeover switch 36. Normally, to charge the high-voltage battery 14, the driver turns on the wireless charging changeover switch 36 near the ground equipment, and once the wireless charging changeover process has started, the driver drives the vehicle 1 to adjust the position of the receiving coil 16 with respect to the supplying coil 103.

When the wireless charging changeover process is started, the vehicle controller 20 commands the rectifier internal controller 18 to start communication, thereby causing the communication unit 19 to start communication (step S1). First, the communication unit 19 establishes communication with the communication unit 106 of the ground equipment, and starts communication. The vehicle controller 20 determines whether the communication unit 19 has established communication within a predetermined time (step S2). If communication has been established, the flow proceeds to the next step, but if there is a timeout, the wireless charging changeover process ends on an error. Normally, communication is established within the predetermined time if the vehicle 1 is close to the ground equipment, but if the vehicle 1 is distant from the ground equipment, communication is not established and a timeout occurs.

When communication has been established, the vehicle controller 20 issues a weak excitation request to the ground equipment by wireless communication (step S3). Specifically, the vehicle controller 20 outputs the command for a weak excitation request to the rectifier internal controller 18, and the rectifier internal controller 18 issues a weak excitation request to the ground equipment controller 105 through wireless communication by the communication unit 19.

The weak excitation request is a request for inducing a weak excitation used for positioning with respect to the supplying coil 103 of the ground equipment. By the weak excitation, the rectifier internal controller 18 detects the coupling strength between the supplying coil 103 and the receiving coil 16, and in the case in which the coupling strength exceeds a predetermined threshold, the rectifier internal controller 18 is able to determine that coupling is complete, and the receiving coil 16 and the supplying coil 103 are positioned correctly.

Next, the vehicle controller 20 determines the current gear shift position on the basis of output from the SBW 33 (step S4). At this timing, the driver is operating the vehicle 1 to position the receiving coil 16 and the supplying coil 103, and if the supplying coil 103 is ahead, the shift position is set to "D: drive". Also, if the supplying coil 103 is behind, the shift position is set to "R: reverse".

If the result of determination in step S4 is that the shift position is "D: drive", the vehicle controller 20 turns off the resolver diagnostic of the front-wheel motor 10 (the output diagnostic of the resolver 10a), and turns off servo control of the front-wheel motor 10 (step S5). However, if these were already off, the off states are left unchanged. Turning off the resolver diagnostic means stopping the output diagnostic action of the resolver 10a, or masking (rendering invalid from a control standpoint) the result of the output diagnostic of the resolver 10a. Turning off the servo control of the front-wheel motor 10 means stopping input and output from the inverter 11 to the front-wheel motor 10 such that the front-wheel motor 10 is not driven even if there are driving operations by the driver, or in other words, stopping driving control. Furthermore, the vehicle controller 20 turns on the resolver diagnostic of the rear-wheel motor 12 (the output diagnostic of the resolver 12a), and turns on servo control of the rear-wheel motor 12 (step S6). However, if these were already on, the on states are left unchanged. Turning on the resolver diagnostic means executing the resolver diagnostic and treating the diagnostic result as valid, while turning on servo control of the rear-wheel motor means enabling driving control of the inverter 13 such that torque is produced according to driving operations.

Figure 3A:
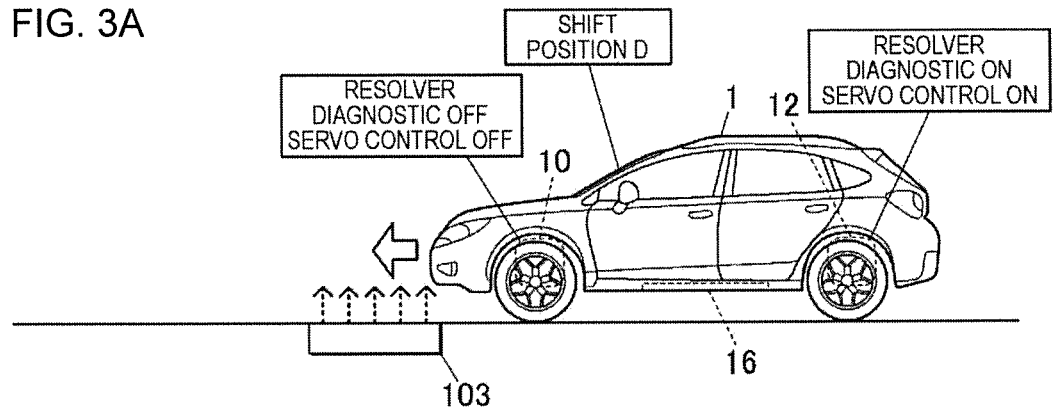
FIG. 3A is an explanatory diagram illustrating an instance of resolver diagnostic switching, and illustrates a first stage in the course of positioning.
Figure 3B:
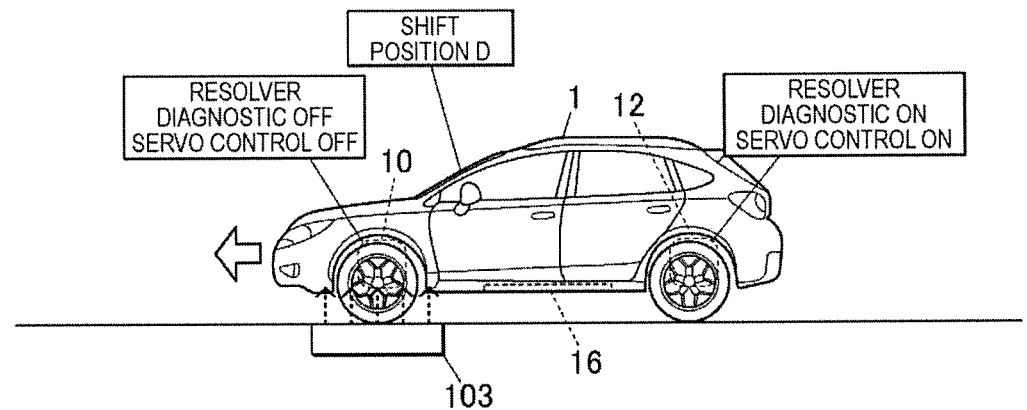
FIG. 3B is an explanatory diagram illustrating an instance of resolver diagnostic switching, and illustrates a second stage in the course of positioning.
Figure 3C:
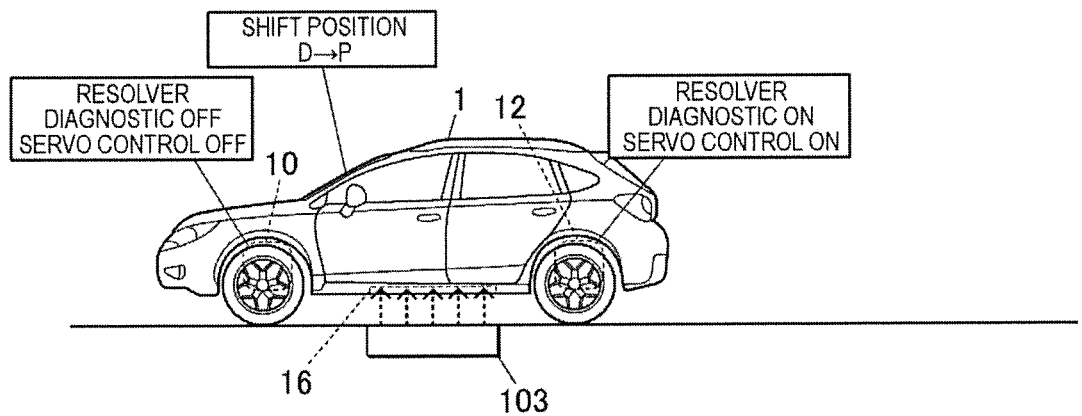
FIG. 3C is an explanatory diagram illustrating an instance of resolver diagnostic switching, and illustrates a third stage in the course of positioning.

FIGS. 3A to 3C are explanatory diagrams illustrating an instance of resolver diagnostic switching. FIGS. 3A to 3C illustrate the course of positioning from a first stage to a third stage.

As described above, in the case in which the shift position is in drive during positioning, as illustrated in FIG. 3A, it is anticipated that the supplying coil 103 is positioned ahead of the receiving coil 16. In this case, during positioning, the front-wheel motor 10 and the resolver 10a pass through the magnetic field of the weakly excited supplying coil 103, whereas the rear-wheel motor 12 and the resolver 12a are apart from the magnetic field. Accordingly, in the process of the above steps S5 and S6, the on/off states of the resolver diagnostic and the servo control of the front-wheel motor 10 and the rear-wheel motor 12 are switched. With this arrangement, as illustrated in FIGS. 3B and 3C, movement of the vehicle 1 is achieved by driving the rear wheels, and even if the front-wheel motor 10 passes through the magnetic field during positioning, a resolver error is suppressed.

On the other hand, if the result of determination in step S4 is that the shift position is "R: reverse", the vehicle controller 20 turns off the resolver diagnostic of the rear-wheel motor 12 (the output diagnostic of the resolver 12a), and turns off servo control of the rear-wheel motor 12 (step S7). However, if these were already off, the off states are left unchanged. Furthermore, the vehicle controller 20 turns on the resolver diagnostic of the front-wheel motor 10 (the output diagnostic of the resolver 10a), and turns on servo control of the front-wheel motor 10 (step S8). However, if these were already on, the on states are left unchanged.

In one example, the process of switching the resolver diagnostic on and off in the above steps S5 to S8 corresponds to one instance of a control action by a controller. Also, in one example, the process of switching the servo control on and off in the above steps S5 to S8 corresponds to one instance of a control action by a drive controller.

Figure 4A:
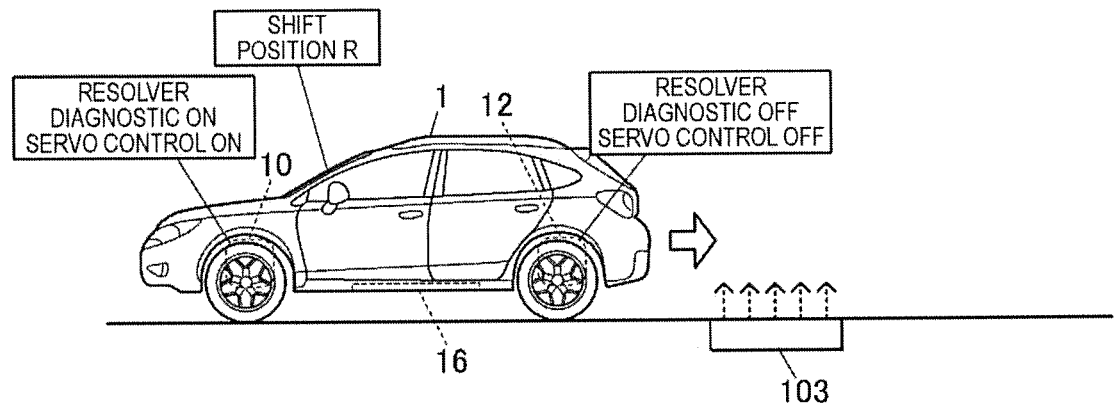
FIG. 4A is an explanatory diagram illustrating an instance of resolver diagnostic switching, and illustrates a first stage in the course of positioning.
Figure 4B:
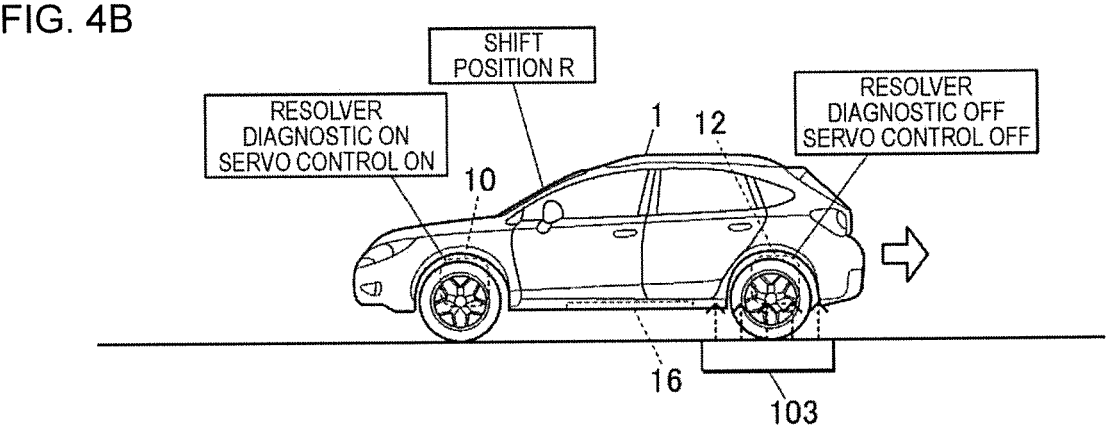
FIG. 4B is an explanatory diagram illustrating an instance of resolver diagnostic switching, and illustrates a second stage in the course of positioning.
Figure 4C:
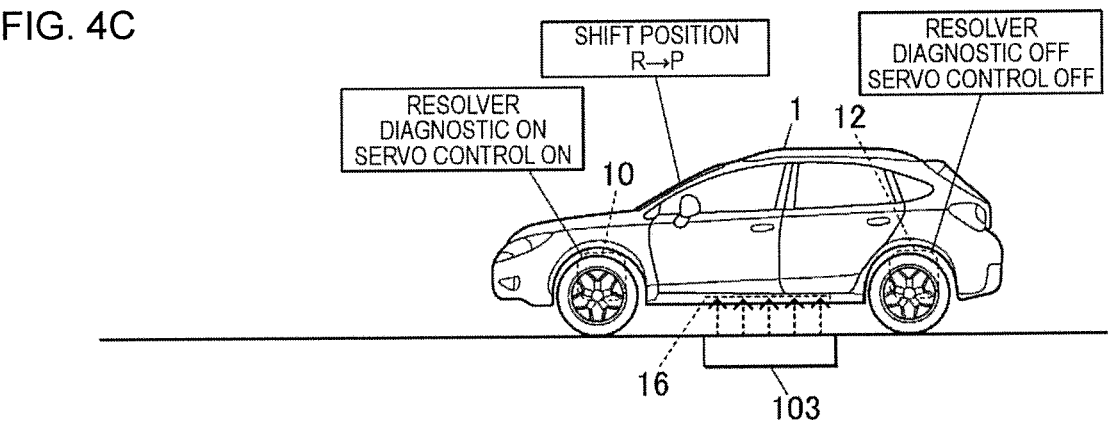
FIG. 4C is an explanatory diagram illustrating an instance of resolver diagnostic switching, and illustrates a third stage in the course of positioning.

FIGS. 4A to 4C are explanatory diagrams illustrating an instance of resolver diagnostic switching. FIGS. 4A to 4C illustrate the course of positioning from a first stage to a third stage.

As described above, in the case in which the shift position is in reverse during positioning, as illustrated in FIG. 4A, it is anticipated that the supplying coil 103 is positioned behind the receiving coil 16. In this case, during positioning, the rear-wheel motor 12 and the resolver 12a pass through the magnetic field of the weakly excited supplying coil 103, whereas the front-wheel motor 10 and the resolver 10a are apart from the magnetic field. Accordingly, in the process of the above steps S7 and S8, the on/off states of the resolver diagnostic and the servo control of the front-wheel motor 10 and the rear-wheel motor 12 are switched. With this arrangement, as illustrated in FIGS. 4B and 4C, movement of the vehicle 1 is achieved by driving the front wheels, and even if the rear-wheel motor 12 passes through the magnetic field during positioning, a resolver error is suppressed.

During the period of positioning through driving by the driver, a loop process including the above switching control (steps S4 to S13) is repeated.

During the loop process of steps S4 to S13, the vehicle controller 20 determines whether a resolver error has occurred (step S9). During the positioning of the receiving coil 16, the driver may drive forward or back up the vehicle 1 too much, and the resolver 10a or the resolver 12a with resolver diagnostic turned on may be exposed to the magnetic field of the supplying coil 103 in some cases. In such cases, a resolver error occurs, and the determination result in step S9 becomes YES.

If a resolver error occurs, normally the vehicle controller 20 internally issues a request for the travel prohibited mode to stop the driving of the front-wheel motor 10 and the rear-wheel motor 12 as a failsafe mode. However, herein, the vehicle controller 20 first masks (renders invalid from a control standpoint) the request for the travel prohibited mode (step S10). In one example, step S10 corresponds to one instance of a control action by a vehicle mode controller. Furthermore, the vehicle controller 20 turns off servo control in the front-wheel motor 10 or the rear-wheel motor 12 where the resolver error occurred (step S11), and returns the process to step S4. By the process of step S10, an undriveable state of the vehicle 1 occurring due to a resolver error may be suppressed, and in addition, by the process of step S11, the continuation of servo control while in the resolver error state may be suppressed. By switching the gear shift position at this point, the driver is able to move the vehicle 1 using the front-wheel motor 10 or the rear-wheel motor 12 distanced from the supplying coil 103, by the process in steps S4 to S8.

Also, during the loop process of steps S4 to S13, the vehicle controller 20 determines whether the coupling between the receiving coil 16 and the supplying coil 103 is complete (step S12), and if coupling is incomplete, the vehicle controller 20 determines whether a predetermined time has elapsed to reach a timeout (step S13). The determination of whether coupling is complete is achieved specifically by having the rectifier internal controller 18 detect the current in the rectifier 17 based on the weak excitation of the supplying coil 103, and in the case in which the current value exceeds a threshold indicating complete coupling, the vehicle controller 20 is notified. The state of complete coupling corresponds to the state in which the receiving coil 16 and the supplying coil 103 are positioned with respect to each other.

If the results of the determinations in steps S12 and S13 are that coupling is incomplete, but a timeout has not been reached, the vehicle controller 20 returns the process to step S4. Also, if a timeout is reached, the vehicle controller 20 issues a request to stop the weak excitation to the ground equipment by wireless communication via the rectifier internal controller 18 (step S14). With this arrangement, the weak excitation of the supplying coil 103 ends, and the wireless charging changeover process ends.

Also, if the result of the determination in step S12 is that coupling is complete, the vehicle controller 20 causes the vehicle 1 to come to a stop, such as by notifying the driver that positioning is complete by display output or sound output (step S15). Next, the vehicle controller 20 starts the charging of the high-voltage battery 14 through the wireless charging unit 15 (step S16). Specifically, the vehicle controller 20 outputs a command to start charging to the rectifier internal controller 18. On the basis of this command, the rectifier internal controller 18 issues a power transmission request to the ground equipment controller 105 by wireless communication, and the ground equipment controller 105 drives the inverter 102 normally to transmit power from the supplying coil 103. By this power transmission, current is delivered from the receiving coil 16 to the rectifier 17, thereby charging the high-voltage battery 14. When charging has started, the wireless charging changeover process ends.

As above, according to the information processing system 1 of Example 1, when positioning the receiving coil 16 with respect to the supplying coil 103, the vehicle controller 20 turns off the resolver diagnostic of the front-wheel motor 10 or the rear-wheel motor 12. With this arrangement, when the front-wheel motor 10 or the rear-wheel motor 12 is exposed to a magnetic field due to the weak excitation of the supplying coil 103, it is possible to avoid falling into a situation where a resolver error is determined, the vehicle 1 becomes unmovable, and wireless charging cannot be performed. Furthermore, by such control, it is no longer necessary to shield the resolver 10a of the front-wheel motor 10 and the resolver 12a of the rear-wheel motor 12 with a thick steel plate, making it possible to avoid a large increase in vehicle weight.

Also, according to the vehicle 1 of Example 1, the vehicle controller 20 switches the resolver diagnostic of the front-wheel motor 10 or the rear-wheel motor 12 on and off according to the gear shift position. The positional relationship between the front-wheel motor 10, the rear-wheel motor 12, and the supplying coil 103 has a certain tendency in accordance with the shift position. For this reason, by switching according to the shift position, it is possible to switch the resolver diagnostic on and off appropriately depending on the situation, such as when the front-wheel motor 10 is close to the magnetic field of the supplying coil 103 and the rear-wheel motor 12 is far away from the magnetic field of the supplying coil 103 or the like, for instance. With this arrangement, for instance, it is possible to shorten the period during which the resolver diagnostic of the front-wheel motor 10 and the rear-wheel motor 12 are switched off to just the necessary range.

Furthermore, according to Example 1, the vehicle controller 20 turns off the servo control of the front-wheel motor 10 or the rear-wheel motor 12 whose resolver diagnostic is turned off, while on the other hand, turns on the servo control of the front-wheel motor 10 or the rear-wheel motor 12 whose resolver diagnostic is not turned off. Consequently, the vehicle 1 travels by the driving of the front-wheel motor 10 or the rear-wheel motor 12 whose resolver diagnostic is turned on, and the receiving coil 16 is positioned thereby. Consequently, in a case such as when there is some kind of actual trouble and a resolver error occurs, it is possible to minimize continued driving of the front-wheel motor 10 or the rear-wheel motor 12 due to overlooking the error.

Modification 1

FIG. 5 is a flowchart illustrating a modification of the wireless charging changeover process.

In Modification 1, the branch process that depends on the gear shift position in step S4 of FIG. 2 has been changed to a branch process that depends on another condition, but otherwise the processes and configuration are similar to Example 1. Only the points that differ will be described in detail.

In Modification 1, in the loop process (steps S4*a* to S13) executed in parallel with positioning driving operations by the driver, first, the vehicle controller 20 detects the position of the supplying coil 103 (step S4*a*). The position detection is not particularly limited, and is sufficiently executed by analysis of an image from the camera 22, for instance. Since the ground equipment has a marking or sign used for positioning, even if the supplying coil 103 cannot be detected directly from an image, the position of the supplying coil 103 can be detected by detecting the marking or sign. Next, the vehicle controller 20 determines whether the supplying coil 103 is ahead of or behind the receiving coil 16, that is, determines the relative positions of the receiving coil 16 and the supplying coil 103 (step S4*b*). As a result, if the supplying coil 103 is ahead, the process branches to steps S5 and S6, and if the supplying coil 103 is behind, the process branches to steps S7 and S8.

Even by such a branch process, during the positioning of the vehicle 1, the resolver diagnostic and the servo control of the front-wheel motor 10 or the rear-wheel motor 12 that is closer to the magnetic field of the supplying coil 103 are turned off, and a resolver error is avoided. Furthermore, in Modification 1, the target resolver diagnostic to turn off is switched between the front wheels and the rear wheels in accordance with the relative positions of the supplying coil 103 and the receiving coil 16. Consequently, even if the driver drives forward or backs up the vehicle 1 too much, an advantageous effect of avoiding a resolver error is exhibited.

Modification 2

Figure 6:
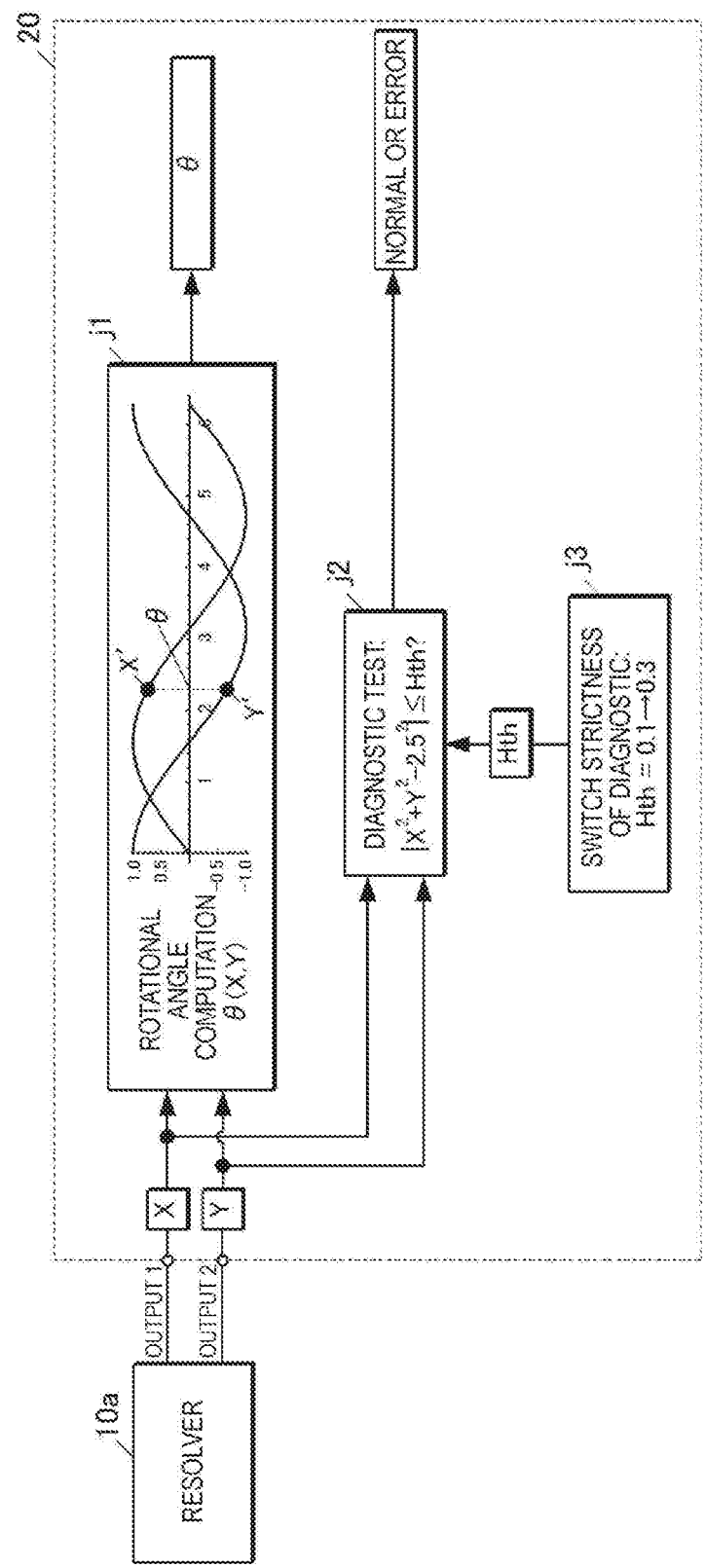
FIG. 6 is a function block diagram illustrating a configuration that switches the resolver diagnostic strictness.

FIG. 6 is a function block diagram illustrating a configuration that switches the resolver diagnostic strictness.

In Modification 2, instead of switching off the resolver diagnostic in steps S5 and S7 of FIG. 2, the resolver diagnostic strictness is switched to make the resolver diagnostic process of the vehicle controller 20 less likely to produce an error as the diagnostic result compared to normal. The resolver diagnostic strictness refers to how relaxed or strict the diagnostic is. Other processes and the configuration are similar to Modification 1, and only the points that differ will be described in detail. Hereinafter, the output of the resolver 10*a* of the front-wheel motor 10 will be described, but the output of the resolver 12*a* of the rear-wheel motor 12 is also similar.

As illustrated in FIG. 6, a rotational position θ of the front-wheel motor 10 is calculated from two output values X and Y of the resolver 10*a* by a rotational angle computation function j1. The output values X and Y are values that depend on the output voltage (for instance, 2.5 V) of the resolver 10*a*. Normally, the sum of squares "$X^2+Y^2$" remains a fixed value (for instance, $2.5^2$), regardless of the rotational angle of the front-wheel motor 10. First, the rotational angle computation function j1 calculates normalized values X' and Y' from the output values X and Y, like in the following Formulas (1) and (2).

$$X'=X/(X^2+Y^2)^{1/2} \quad (1)$$

$$Y'=Y/(X^2+Y^2)^{1/2} \quad (2)$$

The normalized values X' and Y' become values that change according to the rotational position θ of the front-wheel motor 10 on the sine curve and the cosine curve in FIG. 6, respectively. Consequently, the rotational angle computation function j1 is able to calculate the rotational position θ using the normalized values X' and Y'.

The output diagnostic of the resolver 10*a* is executed by using a diagnostic function j2 to calculate how far away the sum of the squares of the output values X and Y are from the normal fixed value (for instance, $2.5^2$). For instance, the diagnostic function j2 compares the absolute value "$|X^2+Y^2-2.5^2|$" of the difference between the sum of the squares of the output values X, Y and the normal fixed value against a threshold Hth, and determines whether the absolute value is equal to or greater than the threshold Hth to determine a normal or error state. In one example, the diagnostic function j2 corresponds to one instance of a control action by a diagnostic module or a first diagnostic module. In one example, the diagnostic function similar to the above for the rear-wheel motor 12 corresponds to one instance of a control action by a second diagnostic module.

In Modification 2, to switch the strictness of the resolver diagnostic, a switch function j3 changes the value of the above threshold Hth from 0.1 to 0.3, for instance. By increasing the value of the threshold Hth in this way, even if the sum of the squares of the output values X and Y of the resolver 10*a* varies relatively largely from the normal value, the determination of an error is suppressed. In one example, the switch function j3 corresponds to one instance of a control action by a controller.

The rotational angle computation function j1, the diagnostic function j2, and the switch function j3 described above are provided as function blocks of the vehicle controller 20. Note that the rotational angle computation function j1 and the diagnostic function j2 may also be provided as functions of the resolver 10*a*, or as functions of a separate electronic control unit (ECU).

According to the vehicle 1 of Modification 2, during the positioning of the receiving coil 16, in steps S5 and S7 of FIG. 2, the resolver diagnostic is switched to a state less likely to produce an error as the diagnostic result in the front-wheel motor 10 or the rear-wheel motor 12 that is closer to the supplying coil 103. With this arrangement, even if the resolver 10*a* or the resolver 12*a* is exposed to the magnetic field of the supplying coil 103, a resolver error is less likely to occur, making it possible to continue positioning.

Note that the threshold Hth that makes the diagnostic result of the resolver diagnostic more difficult to reach an error may be set individually with respect to the front-wheel motor 10 and the rear-wheel motor 12. With this arrangement, it is possible to set a threshold Hth suited to the motor structure and properties of each of the front-wheel motor 10 and the rear-wheel motor 12. By setting a threshold Hth suited to each motor, it is possible to make a resolver error due to the influence of the weak excitation of the supplying coil 103 less likely to occur in both the front-wheel motor 10 and the rear-wheel motor 12. Furthermore, in both the front-wheel motor 10 and the rear-wheel motor 12, it also becomes possible to determine abnormalities intrinsic to the resolver 10a and 12a more accurately even under the influence of the weak excitation of the supplying coil 103.

Note that the above Example 1, Modification 1, and Modification 2 illustrate instances of applying measures to both the resolver diagnostic of the front-wheel motor 10 and the resolver diagnostic of the rear-wheel motor 12 such that a resolver error due to the influence of the weak excitation of the supplying coil 103 is suppressed. However, it is also possible to anticipate cases in which the front-wheel motor 10 and the rear-wheel motor 12 differ greatly in size, structure, disposed height, or the like, or alternatively, cases in which a shield structure using a shielding plate is provided with respect to only one of the front-wheel motor 10 and the rear-wheel motor 12, and the like. With such a configuration, a resolver error occurs readily when one of the front-wheel motor 10 and the rear-wheel motor 12 is close to the weakly excited supplying coil 103, but a resolver error does not occur readily when the other is close to the weakly excited supplying coil 103. Consequently, in the case of such a configuration, resolver diagnostic measures may be applied only to the motor that is easily influenced by the weak excitation of the supplying coil 103 from among the front-wheel motor 10 and the rear-wheel motor 12. In other words, the control to switch the threshold Hth may be applied only to the motor that is easily influenced by the weak excitation of the supplying coil 103. Alternatively, the servo control may be turned off and the resolver diagnostic may be turned off for the motor that is easily influenced by the weak excitation of the supplying coil 103, and the motor that is hardly influenced by the weak excitation of the supplying coil 103 may be driven to position the receiving coil 16. Furthermore, in cases in which one of the front-wheel motor 10 and the rear-wheel motor 12 is effectively shielded against magnetic fields, the motor that is effectively shielded may be driven to position the receiving coil 16, regardless of the shift position of the vehicle 1. At this time, the servo control and the resolver diagnostic may also be turned off for the motor that is not effectively shielded.

Example 2

Figure 7:
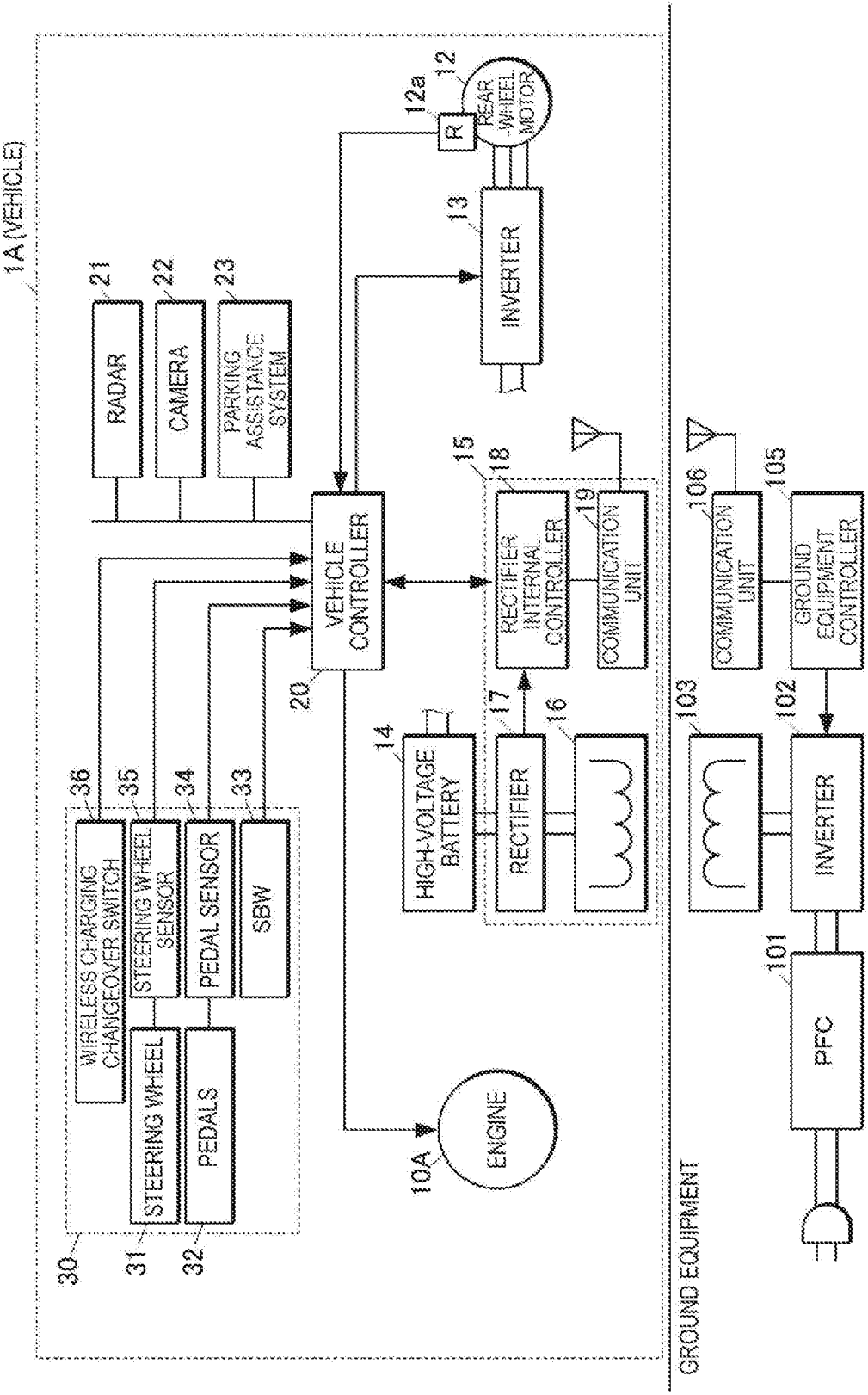
FIG. 7 is a block diagram illustrating a vehicle and ground equipment according to Example 2 of the present invention.

FIG. 7 is a block diagram illustrating a vehicle and ground equipment according to Example 2 of the present invention.

The vehicle 1A of Example 2 is a plug-in hybrid electric vehicle (HEV), and differs from Example 1 by including an engine 10A instead of the front-wheel motor 10, for instance. A detailed description will be omitted for the configuration and processes which are similar to Example 1.

The engine 10A is an internal combustion engine, in which driving torque is controlled by having the vehicle controller 20 control the fuel and the like. The engine 10A is disposed closer to the front wheels than the body center, and drives the front wheels. Note that in Example 2, the engine 10A may be disposed anywhere, and the engine 10A may also be configured to drive the rear wheels like the rear-wheel motor 12. In one example, the engine 10A corresponds to one instance of a "traction driving unit different from a traction motor".

<Wireless Charging Changeover Process>

Figure 8:
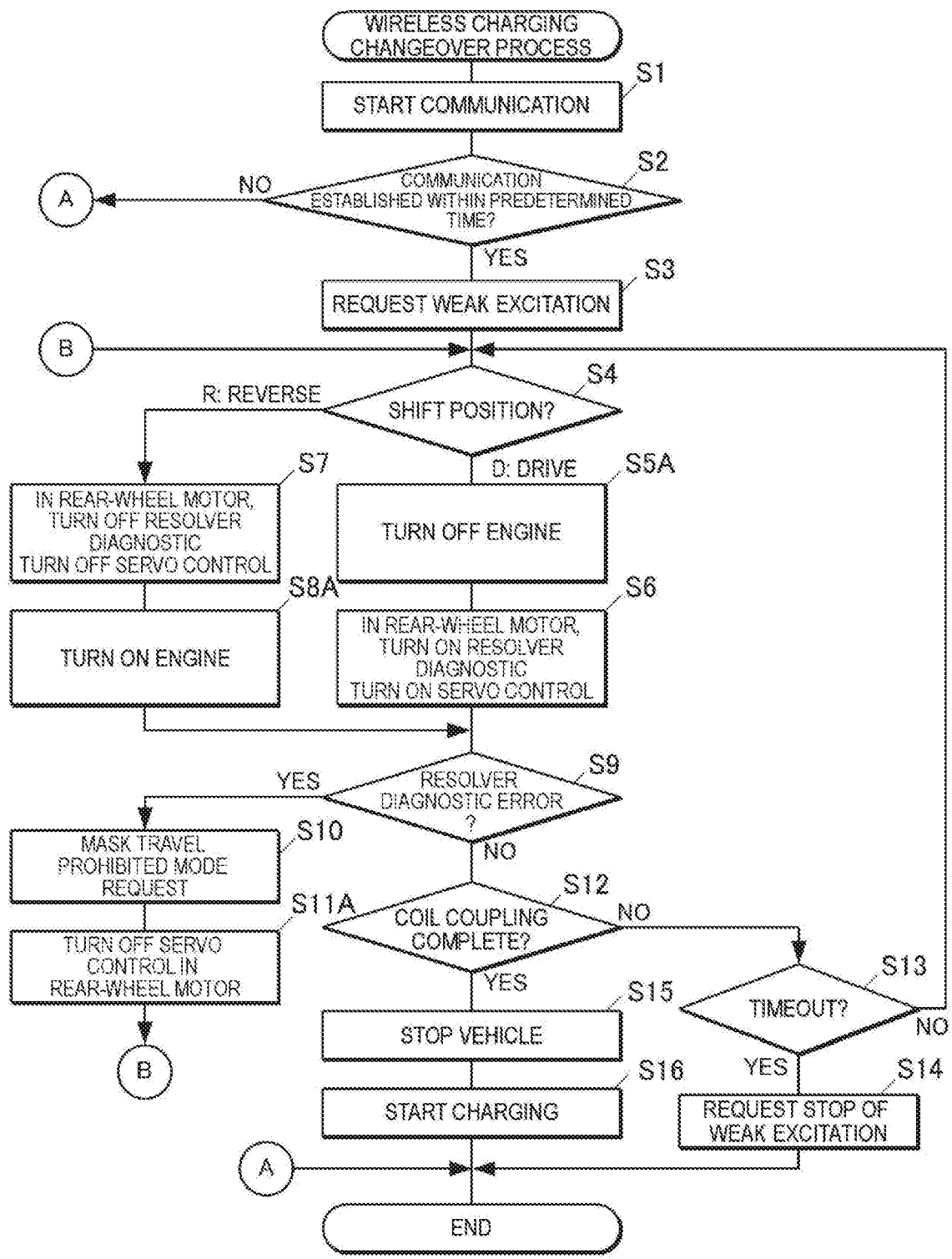
FIG. 8 is a flowchart illustrating a procedure of a wireless charging changeover process according to Example 2.

FIG. 8 is a flowchart illustrating a procedure of a wireless charging changeover process according to Example 2. In the wireless charging changeover process of Example 2, steps S5A, S8A, and S11A are different from the process of Example 1 illustrated in FIG. 2.

In the wireless charging changeover process of Example 2, if the result of determining the gear shift position in step S4 is "D: drive", the vehicle controller 20 turns off the engine 10A (step S5A). Additionally, the vehicle controller 20 turns on the resolver diagnostic and turns on the servo control of the rear-wheel motor 12 (step S6). On the other hand, if the shift position is "R: reverse", the vehicle controller 20 turns off the resolver diagnostic and turns off the servo control of the rear-wheel motor 12 (step S7), and additionally turns on the engine (step S8A). In one example, the processes in steps S5A, S6, S7, and S8A correspond to one instance of a control action by a controller and a drive controller.

Also, in the wireless charging changeover process of Example 2, in the case in which a resolver error is determined in step S9, since the error is confirmed to be of the rear-wheel motor 12, after step S10, the servo control of the rear-wheel motor 12 is turned off (step S11A).

Even with such a configuration and control, when positioning the receiving coil 16, it is possible to avoid exposing the rear-wheel motor 12 to the magnetic field of the supplying coil 103 and resulting in a resolver error. Also, even in the case in which a resolver error occurs, a situation such as the vehicle 1 becoming unmovable may be avoided.

Example 3

Figure 9:
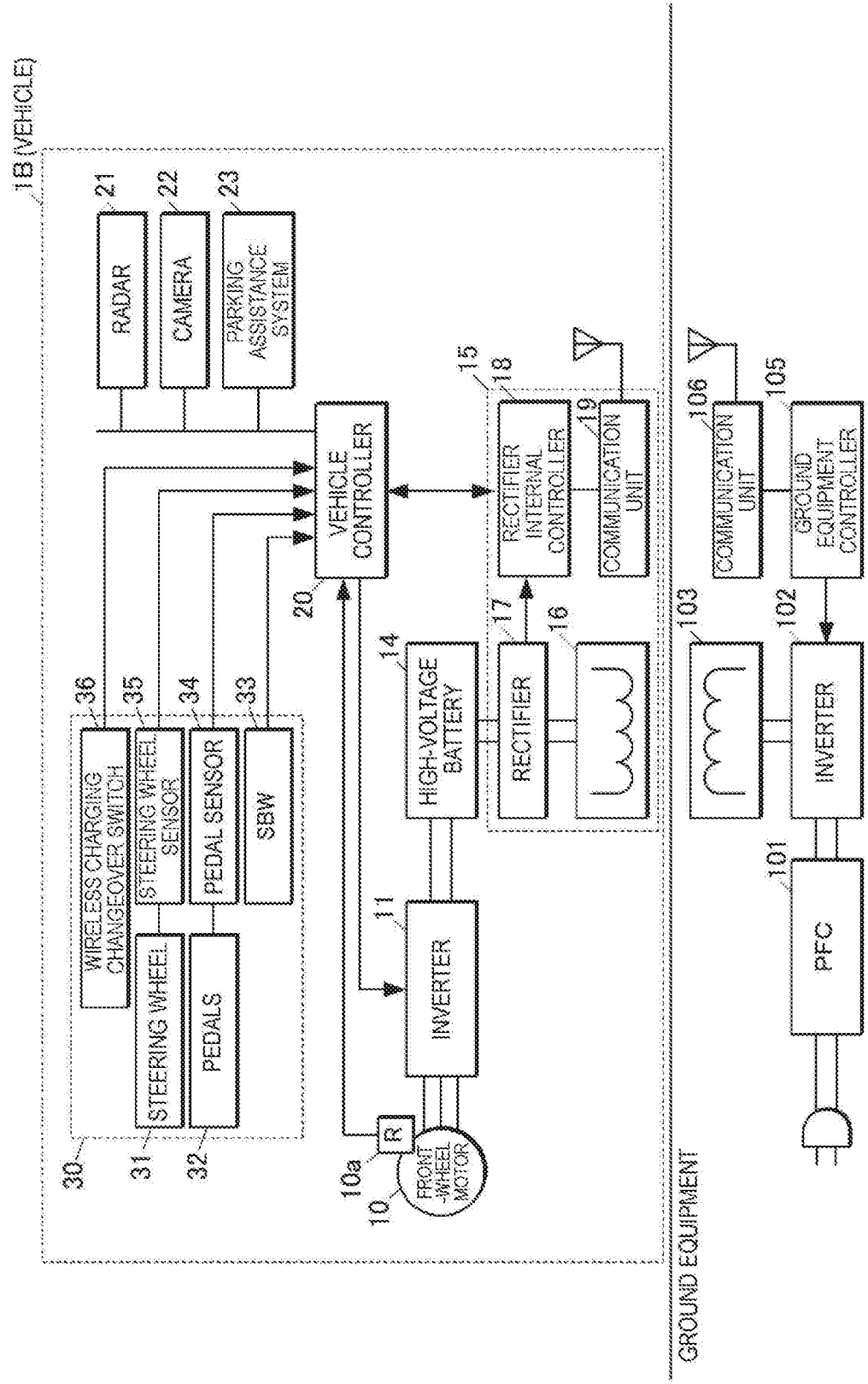
FIG. 9 is a block diagram illustrating a vehicle and ground equipment according to Example 3 of the present invention.

FIG. 9 is a block diagram illustrating a vehicle and ground equipment according to Example 3 of the present invention. FIGS. 10A to 10D are explanatory diagrams illustrating an instance of resolver diagnostic switching according to Example 3. FIGS. 10A to 10D illustrate the course of positioning from a first stage to a fourth stage.

The vehicle 1B of Example 3 differs from Example 1 in that the traction motor is the front-wheel motor 10 only. A detailed description will be omitted for the configuration which is similar to Example 1.

Figure 10A:
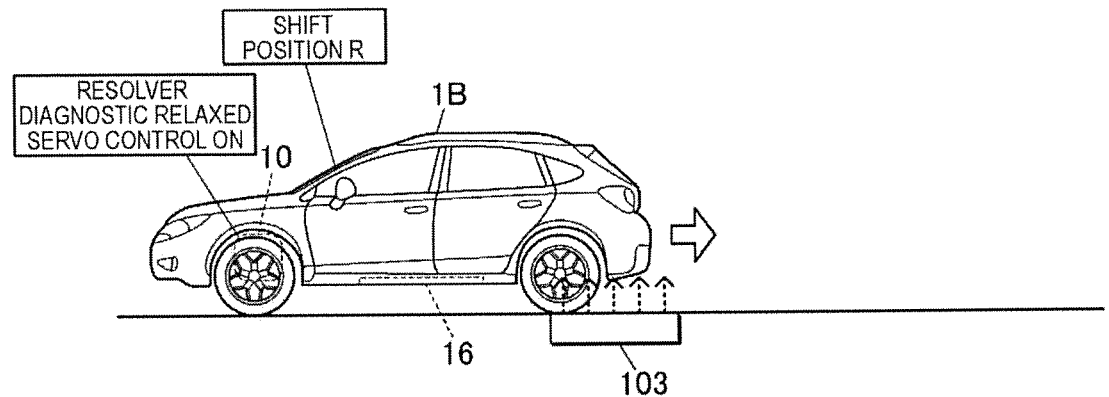
FIG. 10A is an explanatory diagram illustrating an instance of resolver diagnostic switching according to Example 3, and illustrates a first stage in the course of positioning.
Figure 10B:
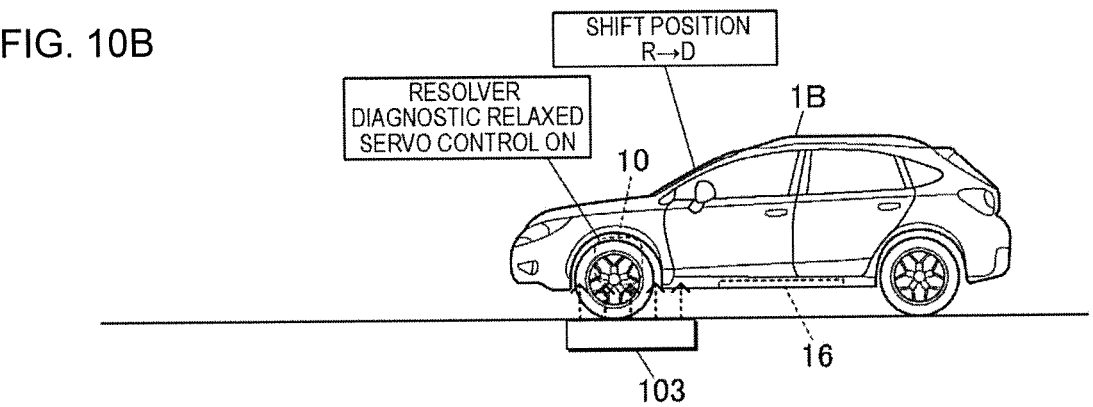
FIG. 10B is an explanatory diagram illustrating an instance of resolver diagnostic switching according to Example 3, and illustrates a second stage in the course of positioning.
Figure 10C:
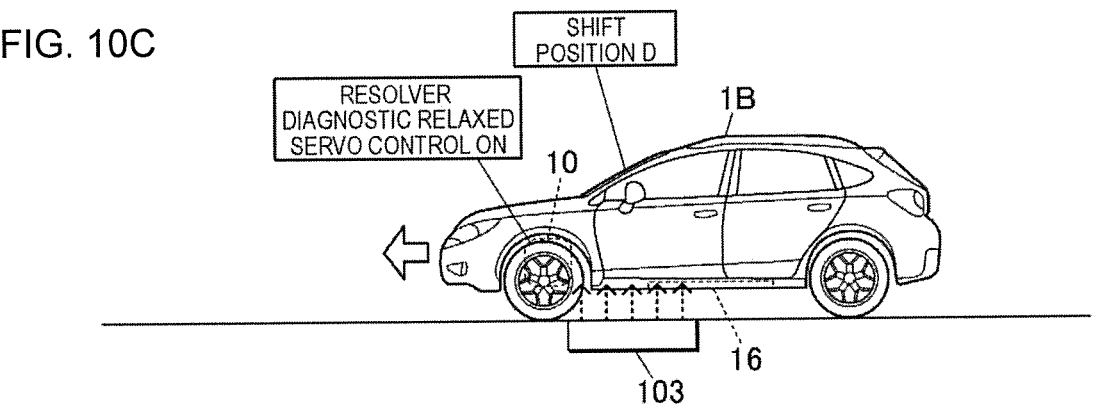
FIG. 10C is an explanatory diagram illustrating an instance of resolver diagnostic switching according to Example 3, and illustrates a third stage in the course of positioning.
Figure 10D:
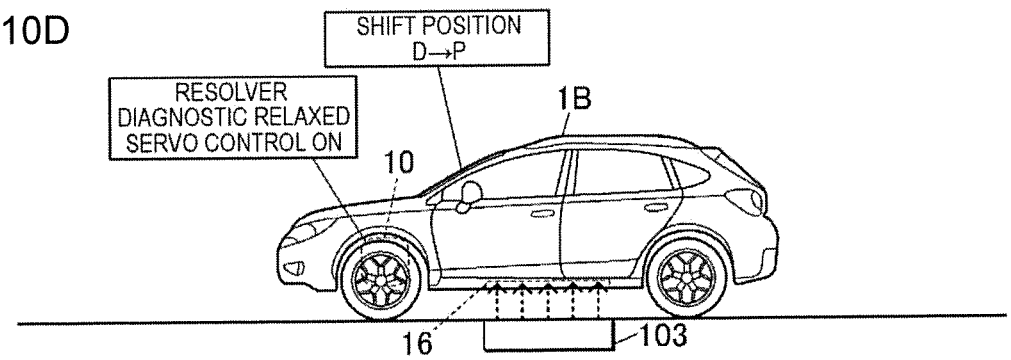
FIG. 10D is an explanatory diagram illustrating an instance of resolver diagnostic switching according to Example 3, and illustrates a fourth stage in the course of positioning.

In Example 3, as illustrated in FIG. 10A, during the positioning of the receiving coil 16, the vehicle controller 20 switches the resolver diagnostic of the front-wheel motor 10 to a relaxed setting in which an error determination is less likely than normal, and additionally turns on the servo control of the front-wheel motor 10. As the relaxed setting of the resolver diagnostic, for instance, the threshold Hth (see FIG. 6) preferably is set such that a resolver error is not determined even in the case in which the front-wheel motor 10 is exposed to a magnetic field due to weak excitation of the supplying coil 103, and also such that normal servo control is not impeded. Also, the threshold Hth preferably is set such that, in a case in which the front-wheel motor 10 is exposed to a magnetic field stronger than the magnetic field due to the weak excitation of the supplying coil 103, or in cases such as when the resolver 10a or the front-wheel motor 10 becomes damaged, a resolver error is determined. In one example, the process of switching the threshold Hth of the resolver diagnostic by the vehicle controller 20 corresponds to one instance of a control action by a controller.

Furthermore, as illustrated in FIGS. 10A to 10D, the vehicle controller 20 of Example 3 continues the above resolver diagnostic setting and the servo control of the front-wheel motor 10, irrespectively of gear shift position or the positional relationship between the receiving coil 16 and the supplying coil 103. The instance in FIGS. 10A to 10D illustrates an instance in which positioning is started with the vehicle 1B in reverse, but since the vehicle 1B is backed up too far, the gear shift position is switched to drive, and positioning is performed again.

In addition, in the hypothetical case in which a resolver error occurs, the vehicle controller 20 of Example 3 puts the vehicle 1B into an undriveable state.

As above, according to the vehicle 1B of Example 3, when positioning the receiving coil 16 with respect to the supplying coil 103, even if the front-wheel motor 10 is exposed to a magnetic field due to the weak excitation of the supplying coil 103, a resolver error is suppressed. Consequently, it is possible to minimize situations in which the vehicle 1B falls into an undriveable state because of the magnetic field of the supplying coil 103 before wireless charging. On the other hand, when a large abnormality occurs in the output of the resolver 10a, the front-wheel motor 10 is stopped, and the continuation of servo control while the abnormality still exists may be prevented.

Example 4

Figure 11:
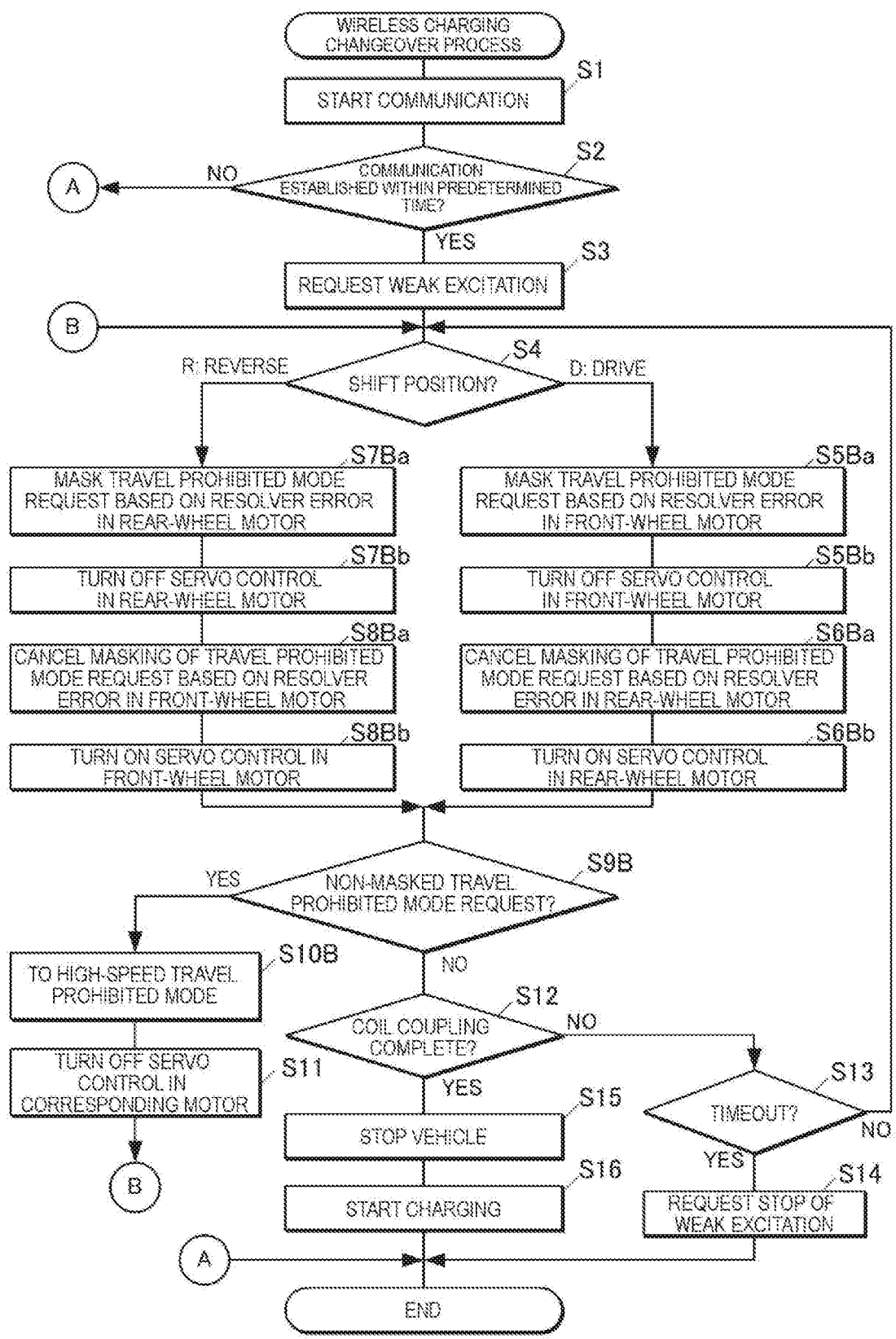
FIG. 11 is a flowchart illustrating a procedure of a wireless charging changeover process according to Example 4 of the present invention.

FIG. 11 is a flowchart illustrating a procedure of a wireless charging changeover process according to Example 4 of the present invention.

The vehicle of Example 4 differs from Example 1 mainly in that, to avoid the influence of the weak excitation of the supplying coil 103, the failsafe mode transition pattern is switched instead of switching the resolver diagnostic on/off in Example 1. Hereinafter, only the points that differ will be described in detail.

The vehicle controller 20 includes a function of switching the transition pattern of a failsafe mode based on the resolver error, on the basis of a trigger for starting the process of positioning the receiving coil 16 with respect to the supplying coil 103. The trigger for starting the positioning of the receiving coil 16 refers to, for instance, the driver turning on the wireless charging changeover switch 36, and also the establishment of communication between the communication unit 106 of the ground equipment and the communication unit 19 of the vehicle 1A.

Details of the switching of the failsafe mode transition pattern are illustrated in the flowchart of FIG. 11. Namely, in the loop process (steps S4 to S14) executed during the positioning of the receiving coil 16, the vehicle controller 20 determines the gear shift position in step S4. If the result of the determination is that the shift position is "D: drive", the vehicle controller 20 executes a process of masking a request for the travel prohibited mode based on a resolver error in the front-wheel motor 10 (step S5Ba), and turns off the servo control of the front-wheel motor 10 (step S5Bb). However, if these processes have been performed already, the states are left unchanged. Next, the vehicle controller 20 cancels the masking of the travel prohibited mode request based on a resolver error in the rear-wheel motor 12 (step S6Ba), and turns on the servo control of the rear-wheel motor 12 (step S6Bb). However, if these processes have been performed already, the states are left unchanged. The "process of masking" above means that applying a setting such that thereafter, until the mask is canceled, the process corresponding to a request is not executed even if the request is made.

On the other hand, if the result of the determination process in step S4 is that the shift position is "R: reverse", the vehicle controller 20 executes a process of masking a request for the travel prohibited mode based on a resolver error in the rear-wheel motor 12 (step S7Ba). Additionally, the vehicle controller 20 turns off the servo control of the rear-wheel motor 12 (step S7Bb). However, if these processes have been performed already, the states are left unchanged. Next, the vehicle controller 20 cancels the masking of the travel prohibited mode request based on a resolver error in the front-wheel motor 10 (step S8Ba), and turns on the servo control of the front-wheel motor 10 (step S8Bb). However, if these processes have been performed already, the states are left unchanged.

By the above steps S5Ba, S6Ba, S7Ba, and S8Bb, requests for the travel prohibited mode are masked in one of the front-wheel motor 10 and the rear-wheel motor 12 anticipated to come close to the supplying coil 103. Additionally, in one of the front-wheel motor 10 and the rear-wheel motor 12, the transition pattern of the failsafe mode based on a resolver error is switched to from a transition to the travel prohibited mode to a pattern with no transition to a failsafe mode. In one example, the above steps S5Ba, S6Ba, S7Ba, and S8Bb correspond to one instance of a control action by a vehicle mode controller.

Furthermore, in the wireless charging changeover process of Example 4, during the loop process of steps S4 to S13, the vehicle controller 20 determines whether a travel prohibited mode request has been issued in one of the front-wheel motor 10 and the rear-wheel motor 12 for which the travel prohibited mode request is not masked (step S9B). During the positioning of the receiving coil 16, the driver may drive forward or back up the vehicle 1 too much in some cases. In such cases, there is a possibility that the resolver 10a or the resolver 12a may be exposed to the magnetic field of the supplying coil 103, and a travel prohibited mode request based on a resolver error in the non-masked resolver may be issued. At this time, the determination result in step S9B becomes "YES".

In the case in which a non-masked travel prohibited mode request is issued, the vehicle controller 20 changes the failsafe mode transition pattern, causing the mode to transition to a high-speed travel prohibited mode (step S10B). The high-speed travel prohibited mode is a mode that prohibits driving at a predetermined speed or above, and allows travel of the vehicle only at low speeds. Next, the vehicle controller 20 turns off servo control in the front-wheel motor 10 or the rear-wheel motor 12 where the resolver error occurred (step S11), and returns the process to step S4. By the process in step S10, a transition to the vehicle travel prohibited mode may be avoided, and by the process in step S11, the continuation of servo control while a resolver error still exists may be suppressed. By switching the gear shift position at this point, the driver is able to move the vehicle using the front-wheel motor 10 or the rear-wheel motor 12 distanced from the supplying coil 103, by the process in steps S4 and S5Ba to S8Bb. Additionally, by the processes in steps S12 to S16, similarly to Example 1, the wireless charging changeover process ends when the positioning of the receiving coil 16 is complete or when a timeout occurs.

As above, according to the vehicle of Example 4, in the wireless charging changeover process, on the basis of a trigger for starting the process of positioning the receiving coil 16 with respect to the supplying coil 103, the vehicle controller 20 changes the pattern of transition to a failsafe mode based on the resolver error. Specifically, the failsafe mode transition pattern is changed for the front-wheel motor 10 or the rear-wheel motor 12 anticipated to be close to the supplying coil 103, and the transition to the travel prohibited mode is invalidated. With this arrangement, even when the front-wheel motor 10 or the rear-wheel motor 12 is exposed to a magnetic field due to the weak excitation of the supplying coil 103, a transition to the travel prohibited mode based on a resolver error may be avoided, making it possible to avoid falling into a situation in which the vehicle 1 becomes unmovable. Furthermore, by such control, it is no longer necessary to shield the resolver 10a of the front-wheel motor 10 and the resolver 12*a* of the rear-wheel motor 12 with a thick steel plate, making it possible to avoid an increase in vehicle weight.

Also, according to the vehicle of Example 4, the above change of the failsafe mode transition pattern is executed with respect to a transition pattern of a failsafe mode based on a resolver error, but failsafe mode transition patterns corresponding to other abnormalities are unaffected. Consequently, when a different abnormality occurs during the wireless charging changeover process, a transition to a failsafe mode corresponding to the abnormality is not impeded.

Also, according to the vehicle of Example 4, the vehicle controller 20 changes the transition pattern of a failsafe mode based on a resolver error in the front-wheel motor 10 or the rear-wheel motor 12 according to the gear shift position. The positional relationship between the front-wheel motor 10, the rear-wheel motor 12, and the supplying coil 103 has a certain tendency in accordance with the shift position. For this reason, by switching according to the shift position, it is possible to switch to a failsafe mode transition pattern suited to the situation, such as when the front-wheel motor 10 is close to the magnetic field of the supplying coil 103 and the rear-wheel motor 12 is far away from the magnetic field of the supplying coil 103 or the like, for instance.

Note that in Example 4, during the wireless charging changeover process, the normal resolver diagnostic is made to continue. However, the control for changing the failsafe mode transition pattern and the control for switching the strictness of the resolver diagnostic may also be used jointly. For instance, with respect to the front-wheel motor 10 or the rear-wheel motor 12 for which the travel prohibited mode request is masked, the resolver diagnostic strictness may be changed to switch to a state in which a resolver error is less likely to be determined. Also, in Example 4, a configuration that masks the transition to the travel prohibited mode is given as an instance of the method for changing the failsafe mode transition pattern. However, a method of changing from a transition to the travel prohibited mode to a transition to the high-speed travel prohibited mode may also be applied as the method for changing the failsafe mode transition pattern.

Example 5

Figure 12:
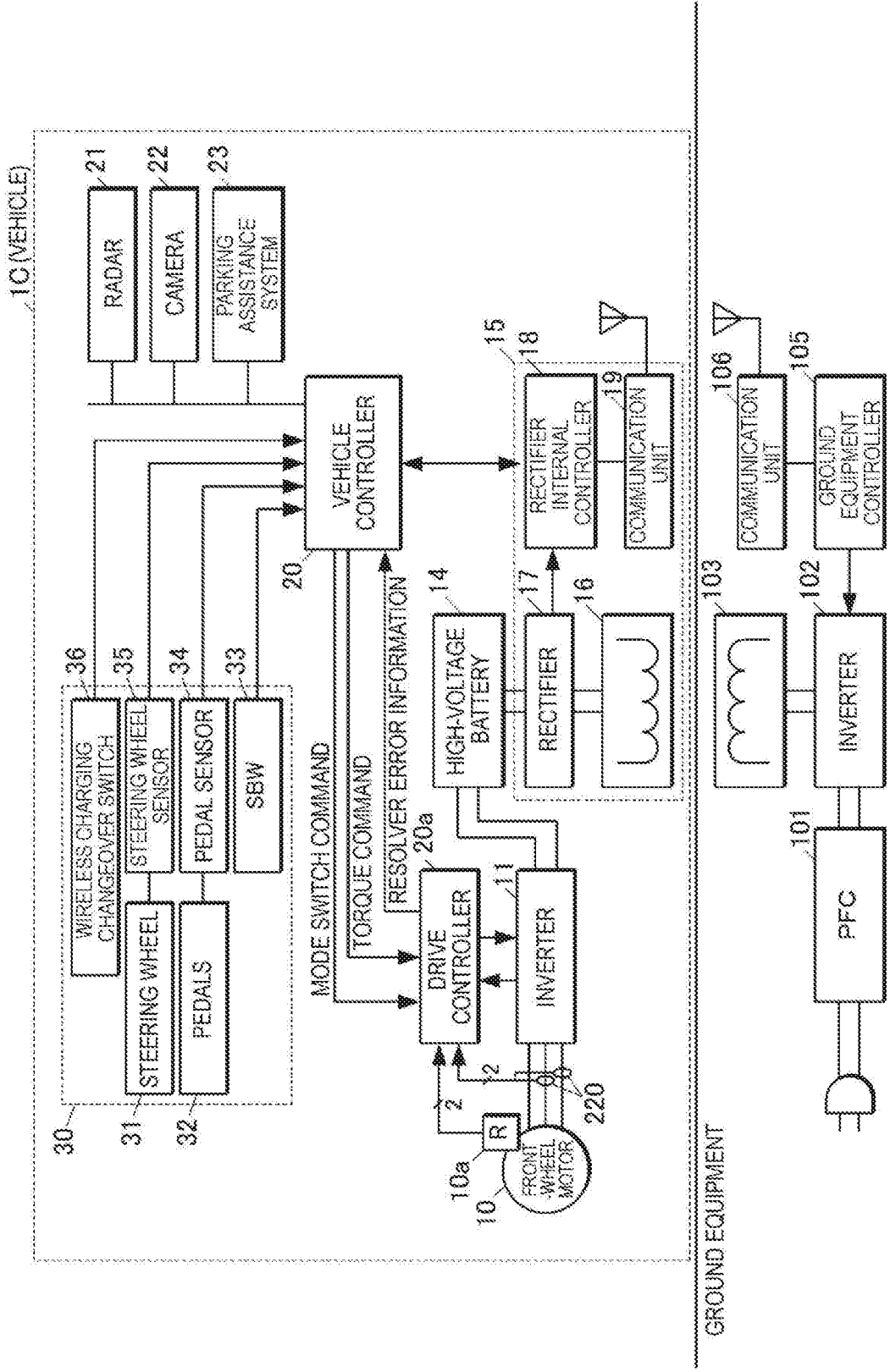
FIG. 12 is a block diagram illustrating a vehicle and ground equipment according to Example 5 of the present invention.
Figure 13:
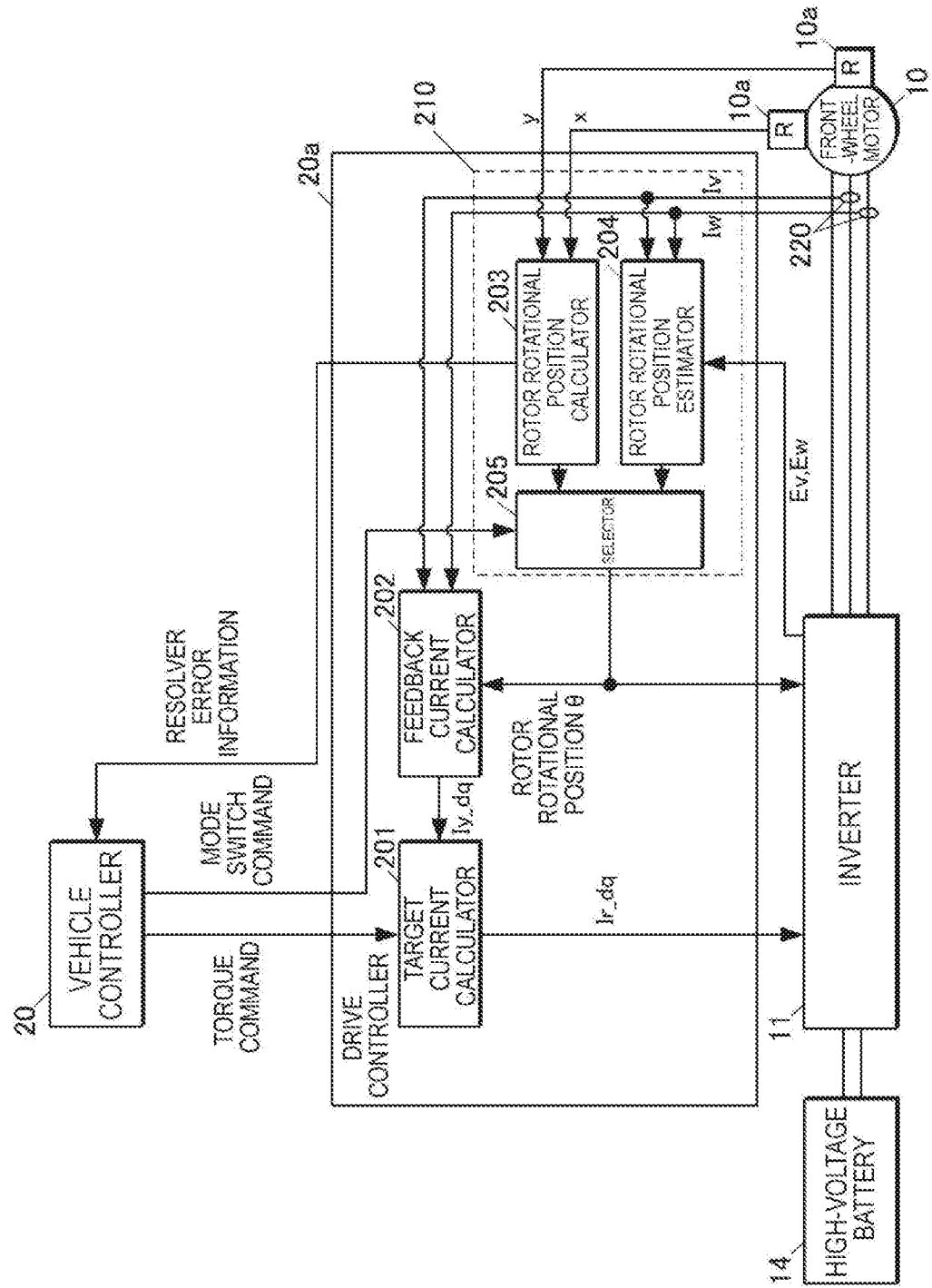
FIG. 13 is a configuration diagram illustrating the drive controller and surrounding configuration in FIG. 12.

FIG. 12 is a block diagram illustrating a vehicle and ground equipment according to Example 5 of the present invention. FIG. 13 is a configuration diagram illustrating the drive controller and surrounding configuration in FIG. 12.

The vehicle 1C of Example 5 differs from Example 1 mainly by being provided with only the front-wheel motor 10 as a traction motor, and by being provided with a drive controller 20*a* as a configuration that drives the inverter 11. Hereinafter, only the points that differ from Example 1 will be described in detail.

In Example 5, the vehicle controller 20 controls the inverter 11 through the drive controller 20*a*. Also, in Example 5, a resolver diagnostic is executed in the drive controller 20*a*, and in the case in which a resolver error occurs, resolver error information is output from the drive controller 20*a* to the vehicle controller 20. Next, details about the drive controller 20*a* will be described.

The drive controller 20*a* receives a torque command of the vehicle controller 20, and controls the output current of the inverter 11 such that the requested torque is output from the front-wheel motor 10. To execute such control, as illustrated in FIG. 13, the drive controller 20*a* includes a target current calculator 201, a feedback current calculator 202, and a rotational position acquirer 210 that acquires and reports information about the rotor rotational position θ of the front-wheel motor 10. Also, the output (x, y) of the resolver 10*a* and current output values (Iv, Iw) of the inverter 11 detected by a current sensor 220 are input into the drive controller 20*a*.

The target current calculator 201 and the feedback current calculator 202 drive the inverter 11 by executing vector control using dq coordinates that rotate synchronously with the rotating magnetic field of the front-wheel motor 10. Specifically, the feedback current calculator 202 receives the current output values (Iv, Iw) of the three-phase current of the inverter 11 and the rotor rotational position θ as input, calculates the present current output value Iy_dq in dq coordinates, and provides the calculated result as feedback to the target current calculator 201. The target current calculator 201 receives the torque command and the feedback current output value Iy_dq as input from the vehicle controller 20. Additionally, the target current calculator 201 executes a feedback control such that torque corresponding to the torque command is obtained, and computes a target current value Ir_dq in dq coordinates. For the above feedback control, proportional-integral (PI) control, proportional-integral-derivative (PID) control, or the like is applied, for instance. The inverter 11 receives the target current value Ir_dq and the rotor rotational position θ, calculates three-phase voltage output values (Eu, Ev, Ew) for outputting the target current value Ir_dq, and drives semiconductor switches such that the calculated result is output. By such action, the front-wheel motor 10 is driven in accordance with the torque command from the vehicle controller 20.

The rotational position acquirer 210 includes a rotor rotational position calculator 203, a rotor rotational position estimator 204, and a selector 205, and outputs a rotor rotational position θ based on the output of the resolver 10*a* or a rotor rotational position θ that is estimated without using the output of the resolver 10*a*. The rotational position acquirer 210 outputs the rotor rotational position θ to the feedback current calculator 202 and the inverter 11.

The rotor rotational position calculator 203 receives the output values (x, y) of the resolver 10*a* of the front-wheel motor 10, and calculates the rotor rotational position θ. Whereas the output value x of the resolver 10*a* varies in proportion to the sine curve "sin θ" corresponding to the rotor rotational position θ, the other output value y of the resolver 10*a* varies in proportion to the cosine curve "cos θ" corresponding to the rotor rotational position θ. Consequently, the rotor rotational position calculator 203 is able to use a predetermined calculation formula to calculate the rotor rotational position θ.

Additionally, the rotor rotational position calculator 203 continuously executes a diagnostic process to determine whether the output values (x, y) of the resolver 10*a* are abnormal. If the sum of the squares of the output values (x, y) are normal, the rotor rotational position θ becomes a fixed value regardless of the angular position. However, in the case in which the resolver 10*a* is exposed to an external magnetic field or the like, for instance, the sum of the squares of the output values (x, y) will diverge greatly from the fixed value in some cases. As the diagnostic process, for instance, the rotor rotational position calculator 203 computes the sum of the squares of the output values (x, y) and the discrepancy of this sum of squares from an ideal value, and determines whether the discrepancy has reached or exceeded a threshold. Additionally, if the threshold is reached or exceeded, an abnormality is determined to exist, and the rotor rotational position calculator 203 outputs resolver error information to the vehicle controller 20.

The rotor rotational position estimator 204 receives the current output values (Iv, Iw) of the three-phase current of the inverter 11 and the voltage output values (Ev, Ew) of the three-phase current of the inverter 11 as input, and uses these values to estimate the rotor rotational position θ of the front-wheel motor 10. As a specific instance, first, the rotor rotational position estimator 204 defines an estimated rotor rotational position θ' and estimated synchronous rotation axis coordinates d'q'. Subsequently, the rotor rotational position estimator 204 uses the detected current output values (Iv, Iw) to compute an estimated voltage value E'_d'q' on the d'q' axes. Also, the rotor rotational position estimator 204 uses the actual voltage output values (Ev, Ew) to compute a voltage output value E_d'q' on the d'q' axes. Furthermore, the rotor rotational position estimator 204 executes, for instance, a proportional-integral (PI) compensation operation on the estimated rotor rotational position θ' such that the differential voltage between the estimated voltage value E'_d'q' and the voltage output value E_d'q' becomes zero. With this arrangement, the defined synchronous rotation coordinate d'q' axes converge on the actual synchronous rotation coordinate dq axes, and the estimated rotor rotational position θ' converges on the actual rotor rotational position θ. Therefore, a rotor rotational position θ' in good agreement with the actual value is obtained, and the rotor rotational position estimator 204 outputs the rotor rotational position θ' as an estimated value. Note that the estimation method given herein is one publicly known method of estimating the rotor rotational position θ. Other publicly known estimation methods may also be applied as the estimation method executed by the rotor rotational position estimator 204.

The selector 205 outputs one of the output from the rotor rotational position calculator 203 and the output from the rotor rotational position estimator 204 to the feedback current calculator 202 and the inverter 11. The selector 205 switches the value to output in accordance with a mode toggle command of the vehicle controller 20.

Mode toggle commands of the vehicle controller 20 include a command regarding a sensing control mode and a command regarding a sensing-less control mode. The sensing control mode is a mode that drives the inverter 11 using the output value of the resolver 10*a*, while the sensing-less control mode is a mode that drives the inverter 11 without using the output value of the resolver 10*a*. The selector 205 passes the output of the rotor rotational position calculator 203 according to the sensing control mode command, and passes the output of the rotor rotational position estimator 204 according to the sensing-less control mode command.

<Wireless Charging Changeover Process>

Figure 14:
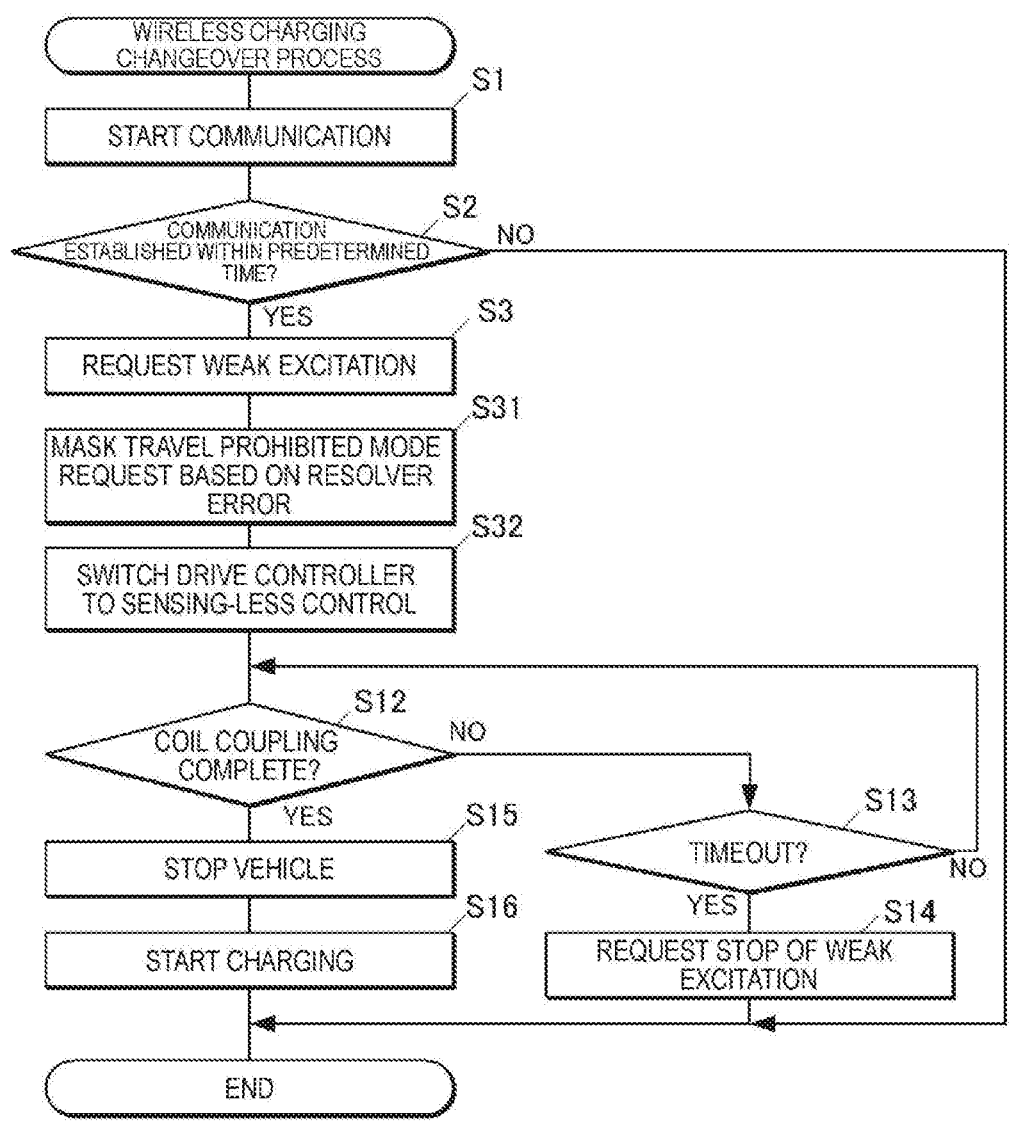
FIG. 14 is a flowchart illustrating a procedure of a wireless charging changeover process according to Example 5.

FIG. 14 is a flowchart illustrating a procedure of a wireless charging changeover process according to Example 5.

The wireless charging changeover process of Example 5 is started by the vehicle controller 20 due to the driver turning on the wireless charging changeover switch 36. In the wireless charging changeover process, steps S1 to S3 and steps S12 to S16 are similar to the steps of Example 1, and a detailed description will be omitted.

In the wireless charging changeover process of Example 5, in the loop process when the vehicle 1C is driven to position the receiving coil 16 with respect to the supplying coil 103, the vehicle controller 20 executes only the determination processes of step S12 and step S13. In other words, in Example 5, in the loop process, the vehicle controller 20 determines whether the coupling between the receiving coil 16 and the supplying coil 103 is complete (step S12), and determines whether a timeout has been reached (step S13).

In the wireless charging changeover process of Example 5, before the loop process of steps S12 and S13, the vehicle controller 20 switches the transition pattern of a failsafe mode based on a resolver error (step S31). In one example, step S31 corresponds to one instance of a control action by a vehicle mode controller. Specifically, the vehicle controller 20 executes a process of masking the travel prohibited mode request based on a resolver error. In one example, the above step S31 corresponds to one instance of a control action by a vehicle mode controller. Additionally, the vehicle controller 20 switches the drive controller 20*a* to the sensing-less control mode (step S32). By this switching, when driving the vehicle 1C to position the receiving coil 16, even if the front-wheel motor 10 is exposed to the magnetic field of the supplying coil 103 and a resolver error occurs, a situation in which the travel prohibited mode is activated and the vehicle 1C becomes undriveable is avoided. Furthermore, by having the drive controller 20*a* operate in the sensing-less control mode, the driving of the front-wheel motor 10 may continue without being influenced by a resolver error.

Additionally, in the loop process of steps S12 and S13, if the vehicle controller 20 determines that the coupling between the receiving coil 16 and the supplying coil 103 is complete, or that a timeout has been reached, steps S14, S15, and S16 similar to Example 1 are executed. Subsequently, the wireless charging changeover process ends.

As above, according to the vehicle 1C of Example 5, the vehicle controller 20 changes the pattern of transition to a failsafe mode based on a resolver error, on the basis of a trigger for starting the step of positioning the receiving coil 16. With this arrangement, when the front-wheel motor 10 is exposed to a magnetic field due to the weak excitation of the supplying coil 103, it is possible to avoid falling into a situation in which the vehicle 1C becomes unmovable due to transitioning to the failsafe mode based on a resolver error. Consequently, operational advantages similar to Example 4 are obtained.

Note that in Example 5, during the wireless charging changeover process, the normal resolver diagnostic is configured to continue, but the strictness of the resolver diagnostic may also be switched such that resolver error is less likely to be determined during the wireless charging changeover process. Also, in Example 5, a configuration that masks the transition to the travel prohibited mode is given as an instance of the method for changing the failsafe mode transition pattern. However, a method of changing from a transition to the travel prohibited mode to a transition to the high-speed travel prohibited mode may also be applied as the method for changing the failsafe mode transition pattern.

Also, step S31 (the step of switching the failsafe mode transition pattern) of the wireless charging changeover process of Example 5 may also be changed to a step of turning off the resolver diagnostic. Even with such a configuration, when the front-wheel motor 10 is exposed to a magnetic field due to the weak excitation of the supplying coil 103, it is possible to avoid falling into a situation in which a resolver error occurs and the vehicle 1C becomes unmovable, while in addition, it becomes possible to drive the vehicle 1C even if a resolver error occurs.

The foregoing describes examples of the present invention. However, the present invention is not limited to the above examples. For instance, in Modification 2 of Example 1 and in Example 3, a method of switching the relative magnitude of the value of the error determination threshold Hth is illustrated as a method of making it less likely than normal that the resolver diagnostic result will be an error. However, the configuration is not limited thereto, and in the case of a configuration that determines a resolver error when an abnormal value is output for a predetermined time or a predetermined number of times, for instance, a method of increasing or decreasing a threshold on the time or number of times that an abnormal value is output to make an error less likely to be determined or the like may also be adopted.

Also, in the above examples, a configuration in which the driver performs driving operations when positioning the receiving coil with respect to the supplying coil is described as an instance, but the parking assistance system 23 may also execute automatic driving to perform the positioning, for instance. Also, in the above examples, the operation of the wireless charging changeover switch 36 by the driver is illustrated as one condition of the trigger for starting the step of positioning the receiving coil 16. However, for instance, the vehicle controller 20 detecting that the vehicle is close to the ground equipment may also be treated as one condition of the trigger for starting the step of positioning the receiving coil. Furthermore, in addition to this detection, the vehicle reaching a low speed that indicates coming to a stop or parking may also be treated as one condition of the trigger for starting the step of positioning the receiving coil. To detect that the vehicle is positioned close to the ground equipment, it is sufficient for the vehicle controller 20 to measure the position of the vehicle 1 by Global Positioning System (GPS) or the like, for instance, and check the measured position against preregistered position data about the ground equipment. Alternatively, by capturing the surroundings of the vehicle 1 with a camera and recognizing the ground equipment by image recognition, it may be determined that the vehicle controller 20 has entered the vicinity of the ground equipment.

Also, the above Examples 1 and 2 illustrate an instance of executing a process (step S10 in FIG. 2) of masking the travel prohibited mode in the case in which the vehicle 1 is moved too far and a resolver error occurs, but instead, a process of transmitting a weak excitation stop request to the ground equipment may also be executed. With this arrangement, the magnetic field of the supplying coil 103 may be stopped, and the resolver error may be canceled.

Also, the rear-wheel motor of Example 2 may be changed to the front-wheel motor. In this case, it is sufficient to reverse the conditions for switching the resolver diagnostic on and off correspondingly. Also, the front-wheel motor 10 of Example 3 or Example 5 may also be a rear-wheel motor, and the disposition thereof is not particularly limited. Furthermore, control similar to Example 3 may also be applied to the vehicle 1 or 1A of Example 1 or Example 2. In other words, in the vehicle 1 or 1A of Example 1 or Example 2, a control may be adopted in which the strictness of the resolver diagnostic is switched in all traction motors when positioning the receiving coil, regardless of the shift position or the relative position between the receiving coil and the supplying coil.

The foregoing describes Example 1 (switching the resolver diagnostic of a vehicle that includes multiple traction motors), Example 2 (switching the resolver diagnostic in an HEV), Example 3 (continuing and switching the strictness of the resolver diagnostic while positioning the receiving coil), Example 4 (switching the transition pattern of a failsafe mode in a vehicle that includes multiple traction motors), Example 5 (continuing and changing the transition pattern of a failsafe mode while positioning the receiving coil), as well as Modification 1 of Example 1 (switching according to the relative positions of the receiving coil and the supplying coil) and Modification 2 of Example 1 (switching the strictness of the resolver diagnostic). However, Modification 2 may also be applied to the control of Modification 1, and the control of Modification 1, Modification 2, or both may also be applied to the configuration of Example 2. Also, the control of Example 3 may be applied to the configuration of Example 1 or Example 2. Also, the control of Example 5 may be applied to the configuration of Example 2 or Example 4.

Also, the foregoing examples illustrate a configuration in which the vehicle controller 20 executes the resolver diagnostic, the switching on and off of the resolver diagnostic, the switching on and off of the servo control, and the drive control of the front-wheel motor 10, the rear-wheel motor 12, and the engine 10A. Furthermore, there is illustrated a configuration in which the vehicle controller 20 executes the switching the failsafe mode transition pattern and the switching between the sensing control and the sensing-less control. However, these processes may also be executed by two or more ECUs separately, and may also be executed by two or more ECUs in cooperation with each other. Otherwise, the details indicated in the examples are appropriately modifiable within a range that does not depart from the gist of the invention.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle comprising:
a traction motor;
a receiving coil configured to receive a power wirelessly; and
a controller configured to execute a diagnostic test of a rotational position sensor of the traction motor, wherein when the receiving coil is positioned with respect to a supplying coil in ground equipment, the controller is configured to adjust a diagnostic strictness of the diagnostic test to be less strict so that a number of errors produced when the receiving coil is positioned with respect to the supplying coil in the ground equipment becomes fewer than a number of errors produced when the receiving coil is not positioned with respect to the supplying coil in the ground equipment.

2. The vehicle according to claim 1, wherein the diagnostic strictness being less strict refers to a stopping of the diagnostic test.

3. The vehicle according to claim 2, wherein during the positioning, the controller switches the diagnostic strictness between a less strict state in which the diagnostic strictness is less strict and a normal state in which the diagnostic strictness if not less strict, according to a gear shift position or relative positions of the supplying coil and the receiving coil.

4. The vehicle according to claim 2, further comprising:
a traction driving unit different from the traction motor; and
a drive controller configured to, when the diagnostic strictness is adjusted to be less strict, cause the vehicle to travel by stopping a driving of the traction motor while also enabling a driving of the different traction driving unit.

5. The vehicle according to claim 2, wherein
the traction motor comprises a front-wheel motor that drives front wheels and a rear-wheel motor that drives rear wheels,
the controller executes a diagnostic test of a rotational position sensor of the front-wheel motor and a diagnostic test of a rotational position sensor of the rear-wheel motor, and
during the positioning, the controller switches a diagnostic strictness of either one of the diagnostic test of the rotational position sensor of the front-wheel motor and the diagnostic test of the rotational position sensor of the rear-wheel motor between a less strict state in which the diagnostic strictness is less strict and a normal state in which the diagnostic strictness if not less strict, according to a gear shift position or relative positions of the supplying coil and the receiving coil.

6. The vehicle according to claim 5, further comprising:
a drive controller configured to control a driving of the front-wheel motor and the rear-wheel motor, wherein
the drive controller stops the driving of one of the front-wheel motor and the rear-wheel motor corresponding to which of the diagnostic test of the rotational position sensor of the front-wheel motor and the diagnostic test of the rotational position sensor of the rear-wheel motor has been switched to the less strict state, while also enabling another of the front-wheel motor and the rear-wheel motor corresponding to which of the diagnostic test of the rotational position sensor of the front-wheel motor and the diagnostic test of the rotational position sensor of the rear-wheel motor has not been switched to the less strict state.

7. The vehicle according to claim 1, wherein during the positioning, the controller switches the diagnostic strictness between a less strict state in which the diagnostic strictness is less strict and a normal state in which the diagnostic strictness if not less strict, according to a gear shift position or relative positions of the supplying coil and the receiving coil.

8. The vehicle according to claim 1, further comprising:
a traction driving unit different from the traction motor; and
a drive controller configured to, when the diagnostic strictness is adjusted to be less strict, cause the vehicle to travel by stopping a driving of the traction motor while also enabling a driving of the different traction driving unit.

9. The vehicle according to claim 1, wherein
the traction motor comprises a front-wheel motor that drives front wheels and a rear-wheel motor that drives rear wheels,
the controller executes a diagnostic test of a rotational position sensor of the front-wheel motor and a diagnostic test of a rotational position sensor of the rear-wheel motor, and
during the positioning, the controller switches a diagnostic strictness of either one of the diagnostic test of the rotational position sensor of the front-wheel motor and the diagnostic test of the rotational position sensor of the rear-wheel motor between a less strict state in which the diagnostic strictness is less strict and a normal state in which the diagnostic strictness if not less strict, according to a gear shift position or relative positions of the supplying coil and the receiving coil.

10. The vehicle according to claim 9, further comprising:
a drive controller configured to control a driving of the front-wheel motor and the rear-wheel motor, wherein
the drive controller stops the driving of one of the front-wheel motor and the rear-wheel motor corresponding to which of the diagnostic test of the rotational position sensor of the front-wheel motor and the diagnostic test of the rotational position sensor of the rear-wheel motor has been switched to the less strict state, while also enabling another of the front-wheel motor and the rear-wheel motor corresponding to which of the diagnostic test of the rotational position sensor of the front-wheel motor and the diagnostic test of the rotational position sensor of the rear-wheel motor has not been switched to the less strict state.

11. The vehicle according to claim 1, further comprising:
a vehicle mode controller configured to cause the vehicle to transition to a failsafe mode on a basis of any error information, wherein
the vehicle mode controller changes a pattern of a transition to a failsafe mode based on an error determination by the diagnostic test, on a basis of a trigger for starting the positioning.

12. The vehicle according to claim 11, wherein the vehicle mode controller prohibits a transition to a failsafe mode that prohibits a travel based on an error determination by the diagnostic test, on the basis of the trigger for starting the positioning.

13. The vehicle according to claim 12, wherein
the traction motor comprises a front-wheel motor that drives front wheels and a rear-wheel motor that drives rear wheels, and
the vehicle mode controller changes a pattern of a transition to a failsafe mode based on a diagnostic result of the rotational position sensor in one of the front-wheel motor and the rear-wheel motor, according to a gear shift position or relative positions of the receiving coil and the supplying coil.

14. The vehicle according to claim 11, wherein
the traction motor comprises a front-wheel motor that drives front wheels and a rear-wheel motor that drives rear wheels, and
the vehicle mode controller changes a pattern of a transition to a failsafe mode based on a diagnostic result of the rotational position sensor in one of the front-wheel motor and the rear-wheel motor, according to a gear shift position or relative positions of the receiving coil and the supplying coil.

15. A vehicle comprising:
a traction motor;
a receiving coil configured to receive a power wirelessly; and
circuitry configured to
execute a diagnostic test of a rotational position sensor of the traction motor, and
when the receiving coil is positioned with respect to a supplying coil in ground equipment, adjust a diagnostic strictness of the diagnostic test to be less strict so that a number of errors produced when the receiving coil is positioned with respect to the supplying coil in the ground equipment becomes fewer than a number of errors produced when the receiving coil is not positioned with respect to the supplying coil in the ground equipment.

* * * * *